United States Patent
Mori et al.

(10) Patent No.: US 11,186,691 B2
(45) Date of Patent: Nov. 30, 2021

(54) EPOXY RESIN COMPOSITION, FIBER REINFORCED COMPOSITE MATERIAL, MOLDED ARTICLE AND PRESSURE VESSEL

(71) Applicant: Toray Industries, Inc., Tokyo (JP)

(72) Inventors: Ayumi Mori, Ehime (JP); Noriyuki Hirano, Ehime (JP); Masayuki Miyoshi, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 10 days.

(21) Appl. No.: 16/848,501

(22) Filed: Apr. 14, 2020

(65) Prior Publication Data

US 2020/0239648 A1 Jul. 30, 2020

Related U.S. Application Data

(63) Continuation of application No. 15/580,375, filed as application No. PCT/JP2016/068504 on Jun. 22, 2016, now Pat. No. 10,696,805.

(30) Foreign Application Priority Data

| Jun. 25, 2015 | (JP) | 2015-127390 |
| Jun. 25, 2015 | (JP) | 2015-127391 |
| Jun. 25, 2015 | (JP) | 2015-127392 |
| Jun. 25, 2015 | (JP) | 2015-127393 |
| Dec. 25, 2015 | (JP) | 2015-253486 |

(51) Int. Cl.

| C08J 5/24 | (2006.01) |
| B32B 27/38 | (2006.01) |
| B32B 27/26 | (2006.01) |
| C08L 63/00 | (2006.01) |
| C08G 59/32 | (2006.01) |
| C08G 59/36 | (2006.01) |
| C08G 59/38 | (2006.01) |
| C08G 59/50 | (2006.01) |
| C08J 5/04 | (2006.01) |
| C08G 59/28 | (2006.01) |
| C08G 59/42 | (2006.01) |
| B01J 3/04 | (2006.01) |
| C08G 59/24 | (2006.01) |

(52) U.S. Cl.
CPC .............. *C08J 5/043* (2013.01); *B01J 3/04* (2013.01); *C08G 59/245* (2013.01); *C08G 59/28* (2013.01); *C08G 59/32* (2013.01); *C08G 59/3218* (2013.01); *C08G 59/3227* (2013.01); *C08G 59/4215* (2013.01); *C08G 59/4238* (2013.01); *C08G 59/50* (2013.01); *C08G 59/504* (2013.01); *C08G 59/5026* (2013.01); *C08G 59/5033* (2013.01); *C08J 5/04* (2013.01); *C08J 2363/00* (2013.01)

(58) Field of Classification Search
None
See application file for complete search history.

(56) References Cited

U.S. PATENT DOCUMENTS

| 4,798,761 A * | 1/1989 | Wykowski ............ C08L 63/00 442/89 |
| 6,596,373 B1 | 7/2003 | Kishi et al. |
| 7,867,568 B2 | 1/2011 | Hillermeier et al. |
| 9,039,951 B2 | 5/2015 | Meegan |
| 9,057,002 B2 | 6/2015 | Padilla-Acevedo et al. |
| 9,249,282 B2 | 2/2016 | Meegan |
| 9,434,811 B2 | 9/2016 | Arai et al. |
| 9,676,937 B2 | 6/2017 | Kobayashi et al. |
| 9,683,072 B2 | 6/2017 | Misumi et al. |
| 10,253,142 B2 | 4/2019 | Matsuda et al. |
| 2008/0108761 A1 | 5/2008 | Kouchi et al. |

(Continued)

FOREIGN PATENT DOCUMENTS

| JP | 6386758 A | 4/1988 |
| JP | 2001323046 | 11/2001 |

(Continued)

OTHER PUBLICATIONS

Chinese Office Action for Chinese Application No. 201680034957.5, dated Mar. 11, 2019, with translation, 15 pages.
Extended European Search Report for European Application No. 16 814 388.1, dated Jan. 21, 2019, 6 pages.
International Search Report and Written Opinion for International Application No. PCT/JP2016/068504, dated Sep. 20, 2016, 8 pages.
Entire patent prosecution history of U.S. Appl. No. 15/580,375, filed Dec. 7, 2017, entitled, "Epoxy Resin Composition, Fiber Reinforced Composite Material, Molded Article and Pressure Vessel."
Notice of Allowance issued In U.S. Appl. No. 15/580,375, dated Apr. 22, 2020, 9 pages.

(Continued)

Primary Examiner — Michael J Feely
(74) Attorney, Agent, or Firm — RatnerPrestia

(57) ABSTRACT

One purpose of the present invention is to provide an epoxy resin composition which is for obtaining a fiber-reinforced composite material that combines heat resistance with tensile strength on a high level. Another purpose is to provide: a fiber-reinforced composite material obtained using this epoxy resin composition; and a molded article and a pressure vessel both containing the fiber-reinforced composite material. The present invention has the following configuration in order to achieve the above purposes. Namely, the epoxy resin composition includes the constituent element [A]: An epoxy resin including an aromatic ring and having a functionality of 2 or higher and the following constituent element [B]: An amine-based hardener, and is characterized in that a cured object obtained by curing the epoxy resin composition has a rubber-state modulus of 10 MPa or less when evaluated for dynamic viscoelasticity and the cured object has a glass transition temperature of 95° C. or higher.

14 Claims, No Drawings

(56) References Cited

U.S. PATENT DOCUMENTS

| | | | |
|---|---|---|---|
| 2012/0035299 A1* | 2/2012 | Arai | C08J 5/24 523/427 |
| 2013/0017103 A1 | 1/2013 | Kodama et al. | |
| 2013/0202873 A1 | 8/2013 | Mizuki et al. | |
| 2013/0225788 A1 | 8/2013 | Meegan | |
| 2014/0213697 A1* | 7/2014 | Kaffee | C08G 59/5026 523/466 |
| 2015/0337075 A1 | 11/2015 | Oshima et al. | |
| 2017/0306117 A1 | 10/2017 | Fuse et al. | |
| 2017/0327652 A1 | 11/2017 | Matsuda et al. | |
| 2018/0122528 A1 | 5/2018 | Yoshida et al. | |

FOREIGN PATENT DOCUMENTS

| | | |
|---|---|---|
| JP | 2002363256 A | 12/2002 |
| JP | 2005120127 A | 5/2005 |
| JP | 2008508113 A | 3/2008 |
| JP | 2010059225 A | 3/2010 |
| JP | 2010150311 A | 7/2010 |
| JP | 4687167 B2 | 5/2011 |
| JP | 2012056980 A | 3/2012 |
| JP | 2012067190 A | 4/2012 |
| JP | 2013001711 A | 1/2013 |
| JP | 2013139564 A | 7/2013 |
| JP | 2014521824 A | 8/2014 |
| JP | 2015003938 A | 1/2015 |
| JP | 2015508125 A | 3/2015 |
| JP | 2016084451 A | 5/2016 |
| WO | 2014112180 A1 | 7/2014 |
| WO | 2015019965 A1 | 2/2015 |
| WO | 2016063692 A1 | 4/2016 |
| WO | 2016067738 A1 | 5/2016 |

OTHER PUBLICATIONS

Non Final Office Action for U.S. Appl. No. 16/848,507, dated Jun. 23, 2021, 22 pages.

\* cited by examiner

EPOXY RESIN COMPOSITION, FIBER REINFORCED COMPOSITE MATERIAL, MOLDED ARTICLE AND PRESSURE VESSEL

CROSS REFERENCE TO RELATED APPLICATIONS

This application is a Continuation Application of U.S. application Ser. No. 15/580,375, filed Dec. 7, 2017, which is the U.S. National Phase application of PCT/JP2016/068504, filed Jun. 22, 2016, which claims priority to Japanese Patent Application Nos. 2015-127390, filed Jun. 25, 2015; JP 2015-127391, filed Jun. 25, 2015; JP 2015-127392, filed Jun. 25, 2015; JP 2015-127393, filed Jun. 25, 2015; and JP 2015-253486, filed Dec. 25, 2015, the disclosures of each of these applications being incorporated herein by reference in their entireties for all purposes.

TECHNICAL FIELD OF THE INVENTION

The present invention relates to an epoxy resin composition, a fiber reinforced material containing a cured product of the epoxy resin composition as a matrix resin, a molded article, and a pressure vessel.

BACKGROUND OF THE INVENTION

Epoxy resins are widely used in industrial fields of coating materials, adhesives, electric and electronic information materials, advanced composite materials and the like owing to their excellent mechanical properties. Epoxy resins are particularly heavily used in fiber reinforced materials made from a reinforcing fiber such as a carbon fiber, a glass fiber, and an aramid fiber, and a matrix resin.

As a method for producing the fiber reinforced material, an appropriate method is selected from methods such as a prepreg method, hand lay-up, filament winding, pultrusion, and Resin Transfer Molding (RTM). Of these methods, the filament winding, pultrusion, and RTM in which a liquid resin is used are particularly actively applied to industrial applications such as pressure vessels, electric wires, and automobiles.

Generally, a fiber reinforced material produced by the prepreg method has excellent mechanical properties because the arrangement of the reinforcing fiber is precisely controlled. Meanwhile, with the recent growing interest in the environment and the trend toward greenhouse gas emission control, higher strength is required of fiber reinforced materials made from a liquid resin similarly to those produced by the prepreg method.

Patent Document 1 discloses a resin for RIM that contains an aliphatic amine hardener and an aromatic amine hardener in combination, rapidly cures at low temperatures, and is excellent in heat resistance. Patent Document 1 also discloses the use of 2,6-diethylaniline as the aromatic amine hardener.

Patent Document 2 discloses an epoxy resin composition that contains a specific bifunctional epoxy resin and a specific aromatic diamine hardener, and is capable of providing a fiber reinforced material excellent in heat resistance, compression strength, and toughness.

Patent Document 3 discloses a low-viscosity epoxy resin composition that contains two kinds of different hardeners and is excellent in produce ability.

Patent Document 4 discloses an epoxy resin composition that contains p-tert-butyl phenyl glycidyl ether as a reactive compound and is excellent in heat resistance and compression properties.

Patent Document 5 discloses an epoxy resin composition that is characterized in having a rubbery plateau portion modulus of 10 MPa or less, and capable of providing a prepreg excellent in adhesion to a honeycomb core and tensile strength.

Patent Document 6 discloses a resin composition that contains a resin composed of a tri- or tetrafunctional epoxy resin and hardeners different in reactivity, and is capable of improving produce ability and compression properties. Patent Document 6 also discloses the use of 4-aminodiphenylamine, which is an aromatic diamine, as a hardener.

Patent Document 7 discloses an epoxy resin composition for a tow prepreg that contains an acid anhydride as a hardener, and is excellent in heat resistance and fracture toughness.

Patent Document 8 discloses a low-viscosity epoxy resin composition that contains a polyfunctional epoxy resin excellent in heat resistance and an acid anhydride as a hardener, and is excellent in heat resistance and rapid-curing property.

Patent Document 9 discloses an epoxy resin composition for RTM that contains an alicyclic epoxy resin, and is excellent in the balance between strength and elongation.

Patent Document 10 discloses a resin for RTM that contains a substituted phenyl glycidyl ether, and is capable of providing a fiber reinforced material excellent in workability and mechanical strength.

Patent Document 11 discloses a resin composition that contains a monofunctional epoxy, in particular, glycidyl phthalimide, and a trifunctional or higher functional epoxy resin, and is capable of improving impact resistance and mechanical characteristics at low temperatures.

Patent Documents 12 and 13 disclose an epoxy resin composition for FRP that contains an epoxy having a pendant group or a monofunctional epoxy and a polyfunctional epoxy, and is excellent in heat resistance and strength properties.

Patent Document 14 discloses an epoxy resin composition that combines heat resistance with mechanical properties owing to incorporation of a thermoplastic resin.

PRIOR ART DOCUMENTS

Patent Documents

Patent Document 1: Published Japanese Translation No. 2015-508125
Patent Document 2: Japanese Patent Laid-open Publication No. 2010-150311
Patent Document 3: Published Japanese Translation No. 2014-521824
Patent Document 4: Japanese Patent No. 4687167
Patent Document 5: Japanese Patent Laid-open Publication No. 2001-323046
Patent Document 6: Published Japanese Translation No. 2008-508113
Patent Document 7: Japanese Patent Laid-open Publication No. 2012-56980
Patent Document 8: Japanese Patent Laid-open Publication No. 2015-3938
Patent Document 9: Japanese Patent Laid-open Publication No. 2013-1711

Patent Document 10: Japanese Patent Laid-open Publication No. 2005-120127

Patent Document 11: Japanese Patent Laid-open Publication No. 2010-59225

Patent Document 12: Japanese Patent Laid-open Publication No. 2012-67190

Patent Document 13: International Publication No. 2011/118106

Patent Document 14: Japanese Patent Laid-open Publication No. 63-86758

SUMMARY OF THE INVENTION

Patent Document 1 discloses a low-viscosity resin excellent in curability and heat resistance, but the resin is insufficient in mechanical properties as carbon fiber-reinforced plastic (hereinafter sometimes referred to as CFRP), and is also insufficient in tensile strength.

The fiber reinforced material of Patent Document 2 is described as excellent in open hole tensile strength and compression strength, but is insufficient in tensile strength.

Patent Document 3 does not specifically mention mechanical characteristics such as tensile strength of the fiber reinforced material.

Patent Document 4 is capable of providing a molded article of a fiber reinforced material excellent in compression strength, but the molded article is insufficient in tensile strength.

The resin of Patent Document 5 is designed for prepregs and has a high viscosity, and cannot be applied to a process in which a liquid resin is used. Moreover, although the resin has high heat resistance, the fiber reinforced material of Patent Document 5 is insufficient in tensile strength.

Patent Document 6 discloses a low-viscosity resin having heat resistance, but the fiber reinforced material of Patent Document 6 is insufficient in tensile strength.

Patent Document 7 discloses a low-viscosity resin excellent in heat resistance and fracture toughness, but the resin is insufficient in mechanical properties as CFRP and is also insufficient in tensile strength.

Patent Documents 8 and 9 also disclose a low-viscosity resin having heat resistance, but the resin is insufficient in mechanical properties as CFRP and is also insufficient in tensile strength.

Patent Document 10 discloses a low-viscosity resin having heat resistance, but the resin is insufficient in mechanical properties as CFRP and is also insufficient in tensile strength.

The resin composition disclosed in Patent Document 11 is intended for prepregs and has a high viscosity, and cannot be applied to a process in which a liquid resin is used. In addition, the performance of this resin composition is improved by control of the arrangement of thermoplastic particles. It is difficult to apply such a design unique to a laminate to a process in which a liquid resin is used, in particular, pultrusion or filament winding.

Patent Documents 12, 13, and 14 also disclose a resin excellent in heat resistance, but the fiber reinforced material of Patent Documents 12, 13, and 14 is insufficient in tensile strength.

In addition, the resin of Patent Document 14 contains a thermoplastic resin for improvement in mechanical properties such as tensile strength, and it is difficult to apply the resin to a process in which a liquid resin is used.

Accordingly, an object of the present invention is to provide an epoxy resin composition intended for providing a fiber reinforced material that combines heat resistance with tensile strength at a high level. Another object of the present invention is to provide a fiber reinforced material made from the epoxy resin composition, and a molded article and a pressure vessel made from the fiber reinforced material.

As a result of intensive studies to solve the above-mentioned problems, the present inventors have found an epoxy resin composition having the following constitution, and have completed the present invention. That is, the epoxy resin composition of the present invention has the following constitution.

The epoxy resin composition of the present invention is an epoxy resin composition containing the following constituent elements [A] and [B], wherein the epoxy resin composition cured into a cured product has a rubbery state elastic modulus in a dynamic viscoelasticity evaluation of 10 MPa or less, and the cured product has a glass transition temperature of 95° C. or higher:

[A] a bifunctional or higher functional epoxy resin containing an aromatic ring; and

[B] an amine hardener or an acid anhydride hardener.

The fiber reinforced material of the present invention is made from a cured product of the epoxy resin composition and a reinforcing fiber.

Further, the molded article and the pressure vessel of the present invention are made from the fiber reinforced material.

Use of the epoxy resin composition of the present invention provides a fiber reinforced material excellent in heat resistance and tensile strength. The epoxy resin composition also provides a molded article and a pressure vessel made from the fiber reinforced material.

DETAILED DESCRIPTION OF THE INVENTION

The epoxy resin composition of the present invention is an epoxy resin composition containing the following constituent elements [A] and [B], wherein the epoxy resin composition cured into a cured product has a rubbery state elastic modulus in a dynamic viscoelasticity evaluation of 10 MPa or less, and the cured product has a glass transition temperature of 95° C. or higher:

[A] a bifunctional or higher functional epoxy resin containing an aromatic ring; and

[B] an amine hardener or an acid anhydride hardener.

The epoxy resin composition of the present invention contains the above-mentioned constituent elements [A] and [B].

The constituent element [A] is a bifunctional or higher functional epoxy resin containing an aromatic ring. The bifunctional or higher functional epoxy resin is a compound having two or more epoxy groups in one molecule. Examples of such an epoxy resin include bisphenol A epoxy resin, bisphenol F epoxy resin, bisphenol S epoxy resin, biphenyl epoxy resin, naphthalene epoxy resin, an epoxy resin containing a dicyclopentadiene backbone, fluorene epoxy resin; novolac epoxy resins such as phenol novolac epoxy resin, and cresol novolac epoxy resin; biphenyl aralkyl epoxy resin and ZYLOCK epoxy resin; and glycidyl amine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, and diglycidyl aniline. These may be used singly or in combination of plural kinds.

The constituent element [B] is an amine hardener or an acid anhydride hardener. The amine hardener is a compound having one or more primary or secondary amino groups in the molecule, and examples thereof include aliphatic polyamines and aromatic polyamines.

The acid anhydride hardener is a compound having one or more acid anhydride groups in the molecule, and examples thereof include methyltetrahydrophthalic anhydride, hexahydrophthalic anhydride, methylhexahydrophthalic anhydride, tetrahydrophthalic anhydride, methyl nadic anhydride, maleic anhydride, and succinic anhydride.

The epoxy resin composition of the present invention cured into a cured product has a rubbery state elastic modulus in the dynamic viscoelasticity evaluation of 10 MPa or less, and the cured product has a glass transition temperature of 95° C. or higher. When the rubbery state elastic modulus and the glass transition temperature are set within these ranges, the resulting fiber reinforced material exhibits excellent heat resistance and high tensile strength translation rate.

In the present invention, the heat resistance of the fiber reinforced material is evaluated based on the glass transition temperature of the fiber reinforced material. The tensile strength of the fiber reinforced material is evaluated based on the tensile strength translation rate. The tensile strength translation rate is an index of utilization of the strength of the reinforcing fiber by the fiber reinforced material. A fiber reinforced material having higher tensile strength translation rate has higher strength than other fiber reinforced materials including the same amount of a reinforcing fiber of the same kind.

When the rubbery state elastic modulus obtained by the dynamic viscoelasticity evaluation of the epoxy resin composition of the present invention cured into a cured product is set to 10 MPa or less, a fiber reinforced material excellent in tensile strength translation rate, that is, excellent in tensile strength is obtained. Herein, the rubbery state elastic modulus is an index having a correlation with the cross-linking density. In general, the lower the cross-linking density is, the lower the rubbery state elastic modulus is. The tensile strength translation rate is represented by (tensile strength of fiber reinforced material)/(tensile strength of reinforcing fiber strands×fiber volume content)×100. A larger tensile strength translation rate value means that the performance of the reinforcing fiber is more effectively utilized, and it can be said that a large effect of weight reduction is exerted.

When the glass transition temperature of the epoxy resin composition cured into a cured product is set to 95° C. or higher, distortion of the fiber reinforced material and deterioration of mechanical characteristics caused by the deformation can be suppressed, and a fiber reinforced material excellent in environmental resistance can be obtained. The conditions for curing the epoxy resin composition of the present invention are not particularly limited, and are appropriately selected according to the properties of the hardener.

Both the rubbery state elastic modulus and the glass transition temperature are indices related to the cross-linking density of the cured epoxy resin. When the rubbery state elastic modulus is high, the cross-linking density is high, and the glass transition temperature is also high. On the other hand, when the rubbery state elastic modulus is low, the cross-linking density is low, and the glass transition temperature is also low. In the present invention, it was found that the lower the rubbery state elastic modulus is, that is, the lower the cross-linking density is, the more the fiber reinforced material is improved in tensile strength. The present invention also overcomes the problem of deterioration of the heat resistance caused by decrease of the rubbery state elastic modulus.

That is, in general, there is a trade-off relationship between a low rubbery state elastic modulus and a high glass transition temperature. The epoxy resin composition of the present invention, however, is a liquid epoxy resin composition that overcomes this trade-off relationship and is capable of providing a fiber reinforced material that combines excellent heat resistance with high tensile strength.

Preferably, the epoxy resin composition according to a first preferable aspect of the present invention contains the following constituent elements [a1] and [a2] as the constituent element [A], and contains the following constituent elements [b1] and [b2] as the constituent element [B]:

[a1] a trifunctional or higher functional aromatic epoxy resin;

[a2] an optionally substituted glycidyl aniline; [b1] an aromatic diamine having a substituent at an ortho position of each amino group or a cycloalkyldiamine having a substituent on a carbon atom adjacent to a carbon atom bonded to each amino group; and

[b2] at least one amine selected from the group consisting of 4,4'-methylenebiscyclohexylamine, 1,3-bisaminomethyl-cyclohexane, N-cyclohexyl-1,3-propanediamine, and isophoronediamine.

The constituent element [a1] is a trifunctional or higher functional aromatic epoxy resin. The trifunctional or higher functional epoxy resin is a compound having three or more epoxy groups in one molecule. Examples of such an epoxy resin include trifunctional or higher functional novolac epoxy resins such as trifunctional or higher functional phenol novolac epoxy resins and trifunctional or higher functional cresol novolac epoxy resins; and glycidyl amine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, and N,N,N',N'-tetraglycidyl-m-xylylenediamine. In particular, an epoxy resin which is liquid at room temperature is suitably used because such an epoxy resin improves the impregnating property into a reinforcing fiber.

The constituent element [a2] is an optionally substituted glycidyl aniline. Examples of the substituent include an alkyl group having 1 to 4 carbon atoms, a phenyl group, and a phenoxy group. An alkyl group having 1 to 4 carbon atoms is preferable because it suppresses the viscosity increase of the epoxy resin. Examples of such an epoxy resin include diglycidyl aniline and diglycidyl toluidine.

The epoxy resin according to the first preferable aspect of the present invention preferably contains 20 to 40 parts by mass of the constituent element [a1] and 20 to 60 parts by mass of the constituent element [a2] in 100 parts by mass of the total epoxy resin. When the amounts of the constituent elements [a1] and [a2] are set within these ranges, a cured epoxy resin capable of providing a fiber reinforced material excellent in the balance between heat resistance and tensile strength translation rate can be easily obtained.

The epoxy resin composition according to the first preferable aspect of the present invention may further contain an epoxy resin other than the constituent elements [a1] and [a2] as long as the effect of the present invention is not impaired, in particular, as long as the viscosity is within a tolerable range. The epoxy resin other than the constituent elements [a1] and [a2] is suitably used because such an epoxy resin can adjust the balance among mechanical properties, heat resistance, and impact resistance, and process compatibility such as viscosity depending on the intended use.

Examples of the epoxy resin other than the constituent elements [a1] and [a2] include reactive diluents having an epoxy group, such as bisphenol A epoxy resin, bisphenol F epoxy resin, bisphenol S epoxy resin, biphenyl epoxy resin, naphthalene epoxy resin, and a monofunctional epoxy. These may be used singly or in combination of plural kinds.

The constituent element [b1] is an aromatic diamine having a substituent at an ortho position of each amino group or a cycloalkyldiamine having a substituent on a carbon atom adjacent to a carbon atom bonded to each amino group.

The diamine of the constituent element [b1] has a substituent near each of two amino groups, and has steric effects near an amino group serving as a reaction point. The substituents may be the same or different. As the substituent, an alkyl group having 1 to 4 carbon atoms is suitably used.

Examples of the aromatic diamine having a substituent at an ortho position of each amino group include 2,6-diaminotoluene, diethyltoluenediamine, 4,4'-diamino-3,3'-diethyldiphenylmethane, 4,4'-diamino-3,3'-dimethyldiphenylmethane, 4,4'-diamino-3,3',5,5'-tetramethyldiphenylmethane, and 4,4'-diamino-3,3',5,5'-tetraethyldiphenylmethane.

Examples of the cycloalkyldiamine having a substituent on a carbon atom adjacent to a carbon atom bonded to each amino group include 3,3'-dimethyl-4,4'-diaminodicyclohexylmethane. These amine hardeners may be used singly or in combination.

The constituent element [b2] is at least one amine selected from the group consisting of 4,4'-methylenebiscyclohexylamine, 1,3-bisaminomethylcyclohexane, N-cyclohexyl-1, 3-propanediamine, and isophoronediamine. The amine of the constituent element [b2] is an amine containing a cyclohexane ring in the molecule and having certain steric confinement near an amino group.

The epoxy resin composition according to the first preferable aspect of the present invention may further contain an amine other than the constituent elements [b1] and [b2] as long as the effect of the present invention is not impaired. Examples of such an amine include diethylenetriamine, triethylenetetramine, hexamethylenediamine, N-aminoethylpiperazine, xylylenediamine, and an aliphatic polyamine having an alkylene glycol structure. Examples of the alkylene glycol structure include polyoxyethylene, polyoxypropylene, and copolymers of polyoxyethylene and polyoxypropylene.

Further, the content of the constituent element [b2] is preferably in the range of 20 to 40 parts by mass in 100 parts by mass of the total hardener. When the content of the constituent element [b2] component is set within this range, a cured epoxy resin capable of providing a fiber reinforced material excellent in the balance between heat resistance and tensile strength translation rate can be easily obtained.

The total amount of the amines serving as the hardener is preferably 0.6 to 1.2 equivalents in terms of the active hydrogen equivalent based on the epoxy groups of all the epoxy resin components contained in the epoxy resin composition. When the total amount of the amines is set within this range, a cured epoxy resin capable of providing a fiber reinforced material excellent in the balance between heat resistance and mechanical properties can be easily obtained.

The reason why the epoxy resin according to the first preferable aspect of the present invention combines heat resistance with tensile strength translation rate well, in other words, combines heat resistance with low rubbery state elastic modulus well is not clear. However, it is presumably because the steric features included in the constituent elements adjust an appropriate balance between the cross-linkage by covalent bonds and the polymer chain confinement due to steric effects. More specifically, the following matter is conceivable: the constituent element [a1] that increases the cross-linking density and improves heat resistance, and the constituent elements [a2] and [b1] that restrict the movement of the molecular chain by potent steric effects adjust the steric interference between the constituent element [A] including the constituent elements [a1] and [a2] and the constituent element [b1] with moderate steric effects and cross-linking density, and the constituent element [b2] that improves the balance between the cross-linkage by covalent bonds and the polymer chain confinement due to steric effects also makes an effective contribution. That is, the cured epoxy resin obtained by curing the combination of the constituent elements [a1], [a2], [b1], and [b2] combines a low rubbery state elastic modulus with a high glass transition temperature well. Further, when the epoxy resin composition is used as a matrix resin, a fiber reinforced material excellent in heat resistance and tensile strength translation rate can be easily obtained.

Preferably, the epoxy resin composition according to a second preferable aspect of the present invention contains the following constituent element [a1] as the constituent element [A], and contains the following constituent elements [b1] and [b3] as the constituent element [B]:

[a1] a trifunctional or higher functional aromatic epoxy resin;

[b1] an aromatic diamine having a substituent at an ortho position of each amino group or a cycloalkyldiamine having a substituent on a carbon atom adjacent to a carbon atom bonded to each amino group; and

[b3] an aromatic monoamine represented by the following general formula (I) or (II):

[Chemical Formula 1]

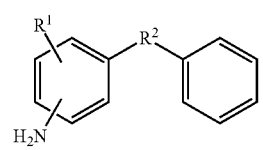

(I)

wherein $R^1$ is a substituent selected from a hydrogen atom and an alkyl group having 1 to 4 carbon atoms, and $R^2$ is a substituent selected from an oxygen atom, a sulfonyl group, and a methylene group; or

[Chemical Formula 2]

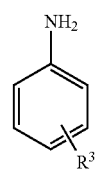

(II)

wherein $R^3$ is a substituent selected from a hydrogen atom and an alkyl group having 1 to 4 carbon atoms.

The trifunctional or higher functional aromatic epoxy resin which is the constituent element [a1] is incorporated for the purpose of improving the heat resistance of the cured epoxy resin composition. Examples of such an epoxy resin include trifunctional or higher functional novolac epoxy resins such as trifunctional or higher functional phenol novolac epoxy resins and trifunctional or higher functional cresol novolac epoxy resins; trifunctional or higher functional biphenyl aralkyl epoxy resin and ZYLOCK epoxy resin; and glycidyl amine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, N,N,N',N'-tetraglycidyl-m-xylylenediamine, and N,N,N',N'-tetraglycidyl-p-xylylenediamine. In particular, an epoxy resin which is liquid at room temperature is suitably used because such an epoxy resin improves the impregnating property into a reinforcing fiber.

In order to make it easier to provide an epoxy resin composition that combines low rubbery state elastic modulus with excellent heat resistance, the content of the constituent element [a1] is preferably in the range of 20 to 70 parts by mass in 100 parts by mass of the total epoxy resin. When the content of the constituent element [a1] is set within this range, an epoxy resin composition capable of providing a cured product excellent in the balance between rubbery state elastic modulus and glass transition temperature can be easily obtained.

Further, the epoxy resin composition may contain an epoxy resin other than the constituent element [a1] as long as the effect of the present invention is not impaired. The epoxy resin other than the constituent element [a1] is suitably used because such an epoxy resin can adjust the balance among mechanical properties, heat resistance, and impact resistance, and process compatibility such as viscosity.

Examples of the epoxy resin other than the constituent element [a1] include bisphenol A epoxy resin, bisphenol F epoxy resin, bisphenol S epoxy resin, biphenyl epoxy resin, naphthalene epoxy resin, an epoxy resin having a fluorene backbone, diglycidyl resorcinol, glycidyl ether epoxy resin, N,N-diglycidyl aniline, and N,N-diglycidyl-o-toluidine. These epoxy resins may be used singly or in combination of plural kinds.

The diamine of the constituent element [b1] is an aromatic diamine having a substituent at an ortho position of each amino group or a cycloalkyldiamine having a substituent on a carbon atom adjacent to a carbon atom bonded to each amino group. The diamine has a substituent near each of two amino groups, and has steric effects near an amino group serving as a reaction point. The substituents may be the same or different.

As the substituent, an alkyl group having 1 to 4 carbon atoms is suitably used from the viewpoint of potent steric effects. Among them, a methyl group or an ethyl group is particularly suitably used from the viewpoint that a cured product having a high glass transition temperature can be easily obtained.

When an aromatic diamine having a substituent at an ortho position of each amino group or a cycloalkyldiamine having a substituent on a carbon atom adjacent to a carbon atom bonded to each amino group is used, steric effects produced by the constituent elements [b1] and [b3] increase the polymer chain confinement, and a fiber reinforced material more excellent in heat resistance and tensile strength translation rate can be easily obtained.

Examples of the aromatic diamine having a substituent at an ortho position of each amino group include 2,6-diaminotoluene, diethyltoluenediamine, 4,4'-diamino-3,3'-diethyldiphenylmethane, 4,4'-diamino-3,3'-dimethyldiphenylmethane, 4,4'-diamino-3,3',5,5'-tetramethyldiphenylmethane, and 4,4'-diamino-3,3',5,5'-tetraethyldiphenylmethane.

Examples of the cycloalkyldiamine having a substituent on a carbon atom adjacent to a carbon atom bonded to each amino group include 2,2'-dimethyl-4,4'-diaminodicyclohexylmethane, 3,3'-dimethyl-4,4'-diaminodicyclohexylmethane, and 3,3'-diethyl-4,4'-diaminodicyclohexylmethane.

The aromatic monoamine which is the constituent element [b3] is suitably used because it combines heat resistance with tensile strength translation rate well. The constituent element [b3] exhibits excellent heat resistance and high tensile strength translation rate when combined with the constituent element [b1].

The constituent element [b3] is an aromatic monoamine represented by the following general formula (I) or (II), or a combination thereof. The combination of the constituent element [b3] with the constituent element [a1] provides a fiber reinforced material more excellent in heat resistance and tensile strength translation rate.

[Chemical Formula 3]

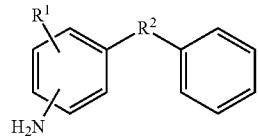

(I)

In the chemical formula, $R^1$ is a substituent selected from a hydrogen atom and an alkyl group having 1 to 4 carbon atoms, and $R^2$ is a substituent selected from an oxygen atom, a sulfonyl group, and a methylene group.

[Chemical Formula 4]

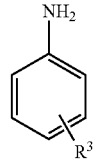

(II)

In the chemical formula, $R^3$ is a substituent selected from a hydrogen atom and an alkyl group having 1 to 4 carbon atoms.

Examples of the aromatic monoamine represented by the general formula (I) include 2-aminodiphenylmethane, 4-aminodiphenylmethane, 2-aminodiphenylsulfone, 4-aminodiphenylsulfone, and 4-aminodiphenyl ether. In particular, 4-aminodiphenyl ether has phenoxyaniline having more potent steric effects than aniline does. Thus, when 4-aminodiphenyl ether is used in combination with the constituent element [b1], it is possible to improve the heat resistance while specifically suppressing an increase in cross-linking density.

Examples of the aromatic monoamine represented by the general formula (II) include p-toluidine, 3-methylaniline, 3-ethylaniline, 3-isopropylaniline, and 3-hydroxy-4-methylaniline. In particular, an aromatic monoamine which is liquid at room temperature is suitably used because such an aromatic monoamine improves the impregnating property into a reinforcing fiber.

In the epoxy resin composition according to the second preferable aspect of the present invention, the constituent element [b3] is preferably an aromatic monoamine represented by the general formula (I). Since the aromatic monoamine represented by the general formula (I) of the constituent element [b3] has more potent steric effects than the aromatic monoamine represented by the general formula (II) does, the steric effects described later are further enhanced.

The epoxy resin composition according to the second preferable aspect of the present invention may further contain an aromatic amine and an aliphatic amine other than the constituent elements [b1] and [b3] as long as the effect of the present invention is not impaired.

Examples of such an aliphatic amine include aliphatic polyamines having an alkylene glycol structure. Examples of the alkylene glycol structure include polyoxyethylene, polyoxypropylene, and copolymers of polyoxyethylene and polyoxypropylene. Among them, an aliphatic polyamine having an amino group at the terminal is excellent in reactivity with an epoxy resin, and easily incorporated into a network with an epoxy resin. Examples of the aliphatic polyamine having an amino group at the terminal include aliphatic polyamines having a 2-aminopropyl ether structure, a 2-aminoethyl ether structure, or a 3-aminopropyl ether structure.

Further, the content of the constituent element [b3] is preferably in the range of 10 to 60 parts by mass in 100 parts by mass of the total hardener. When the content of the constituent element [b3] is set within this range, an epoxy resin composition capable of providing a fiber reinforced material excellent in the balance between heat resistance and tensile strength translation rate can be easily obtained.

The amount of the amine serving as the hardener is preferably 0.6 to 1.2 equivalents in terms of active hydrogen groups based on the epoxy groups of all the epoxy resin components contained in the epoxy resin composition. When the amount of the amine is set within this range, a cured resin capable of providing a fiber reinforced material excellent in the balance between heat resistance and mechanical properties can be easily obtained.

The reason why the epoxy resin composition according to the second preferable aspect of the present invention combines heat resistance with tensile strength translation rate well, in other words, combines heat resistance with low rubbery state elastic modulus well is not clear. However, it is presumably because the substituent having potent steric effects in the constituent element [b3] interferes with the curing reaction of the constituent element [b1], and the resulting cured product has the cross-linkage by covalent bonds and the polymer chain confinement due to steric effects in a well-balanced manner. In the cured epoxy resin composition, the aromatic ring of the aromatic monoamine represented by the general formula (I) or (II) of the constituent element [b3], as steric effects, interferes with the substituent at an ortho position of each amino group or a substituent adjacent to a carbon atom bonded to each amino group in the constituent element [b1], and restricts the movement of the molecular chain. As a result, even if the cured epoxy resin composition is low in density of cross-linkage derived from covalent bonds, the cured epoxy resin composition exhibits high heat resistance.

In general, the constituent element [a1] is a component that increases the cross-linking density to improve the heat resistance. When the constituent element [a1] is used in combination with the constituent elements [b1] and [b3], part of the epoxy resin is affected by steric effects and remains unreacted, and serves as additional steric effects. Thus, movement of the molecular chain is restricted in a state where the cross-linking density is low. That is, the cured epoxy resin obtained by curing the combination of the constituent elements [a1], [b1], and [b3] combines a low rubbery state elastic modulus with excellent heat resistance. Further, when the epoxy resin composition is used as a matrix resin, a fiber reinforced material excellent in heat resistance and tensile strength translation rate can be easily obtained.

Preferably, the epoxy resin composition according to a third preferable aspect of the present invention contains the following constituent element [a3] as the constituent element [A], and contains the following constituent elements [b4] and [b5] as the constituent element [B]:

[a3] a bifunctional or higher functional epoxy resin having a fluorene structure;

[b4] an acid anhydride represented by the following general formula (III):

[Chemical Formula 5]

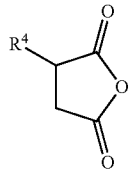

(III)

wherein $R^4$ represents anyone of linear or branched alkyl, alkenyl, and alkynyl groups having 6 to 16 carbon atoms; and

[b5] at least one acid anhydride selected from the group consisting of tetrahydrophthalic anhydride, methyltetrahydrophthalic anhydride, methyl nadic anhydride, hexahydrophthalic anhydride, and methylhexahydrophthalic anhydride.

The constituent element [a3] is a bifunctional or higher functional epoxy resin having a fluorene structure. Examples of such an epoxy resin include a diglycidyl ether of bishydroxyphenylfluorene.

The acid anhydride represented by the general formula (III) which is the constituent element [b4] is suitably used because it is excellent in heat resistance and tensile strength translation rate. The constituent element [b4] is incorporated for the purpose of increasing the tensile strength translation rate while suppressing the deterioration of the heat resistance. In addition, in order to combine the heat resistance with the tensile strength translation rate, the number of carbon atoms of the substituent represented by $R^4$ in the constituent element [b4] should be in the range of 6 to 16, preferably in the range of 8 to 12. Examples of such an acid anhydride include 3-dodecenylsuccinic anhydride and octenyl succinic anhydride.

The constituent element [b5] exhibits excellent heat resistance and high tensile strength translation rate when combined with the constituent element [b4].

The constituent element [b5] is at least one acid anhydride selected from the group consisting of tetrahydrophthalic anhydride, methyltetrahydrophthalic anhydride, methyl nadic anhydride, hexahydrophthalic anhydride, and methylhexahydrophthalic anhydride.

The total amount of the constituent elements [b4] and [b5] is preferably in the range of 0.6 to 1.2 equivalents in terms of the acid anhydride equivalent based on the epoxy groups of all the epoxy resin components contained in the epoxy resin composition. When the total amount is set within this range, a cured resin capable of providing a fiber reinforced material excellent in the balance between heat resistance and mechanical properties can be easily obtained.

When an acid anhydride is used as a hardener, an accelerator is generally used in combination. As the accelerator, an imidazole accelerator, a DBU salt, a tertiary amine, a Lewis acid or the like is used.

The epoxy resin composition according to the third preferable aspect of the present invention preferably has a ratio of parts by mass of the constituent element [b4] to the sum of parts by mass of the constituent elements [b4] and [b5] of 0.3 to 0.6. When the content ratio of the constituent element [b4] is set within this range, an epoxy resin composition capable of providing a cured product excellent in the balance between rubbery state elastic modulus and glass transition temperature can be easily obtained.

This effect is even greater if the constituent element [A] includes the constituent element [a3]. In the cured epoxy resin composition, the fluorene ring of the constituent element [a3], as steric effects, interferes with $R^4$ of the constituent element [b4] and the cycloalkane or cycloalkene moiety of the constituent element [b5], and restricts the movement of the molecular chain. As a result, even if the cured epoxy resin composition is low in density of crosslinkage derived from covalent bonds, the cured epoxy resin composition exhibits high heat resistance. In addition, since the constituent element [a3] is solid, it increases the viscosity of the epoxy resin composition. Thus, it is difficult to apply the constituent element [a3] to the filament winding or pultrusion which normally requires a low-viscosity resin. However, in the present invention, an epoxy resin composition having sufficiently low viscosity can be obtained even if a solid component such as the constituent element [a3] is incorporated, since the constituent elements [b4] and [b5] used as the hardener have a very low viscosity.

The epoxy resin composition according to the third preferable aspect of the present invention may further contain an epoxy resin other than the constituent element [a3] as long as the effect of the present invention is not impaired. The epoxy resin other than the constituent element [a3] is suitably used because such an epoxy resin can adjust the balance among mechanical properties, heat resistance, and impact resistance, and process compatibility such as viscosity depending on the intended use.

Examples of the epoxy resin other than the constituent element [a3] include bisphenol A epoxy resin, bisphenol F epoxy resin, bisphenol S epoxy resin, biphenyl epoxy resin, naphthalene epoxy resin, an epoxy resin containing a dicyclopentadiene backbone; novolac epoxy resins such as phenol novolac epoxy resin, and cresol novolac epoxy resin; biphenyl aralkyl epoxy resin and ZYLOCK epoxy resin; glycidyl amine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylenedianiline, N,N,N',N'-tetraglycidyl-2,2'-diethyl-4,4'-methylenedianiline, and N,N,N',N'-tetraglycidyl-m-xylylenediamine; alicyclic epoxy resins; and aliphatic epoxy resins.

The reason why the epoxy resin composition according to the third preferable aspect of the present invention combines heat resistance with tensile strength translation rate well, in other words, combines heat resistance with low rubbery state elastic modulus well is not clear. However, it is presumably because the substituent moiety of the constituent element [b4], that is, the moiety represented by $R^4$ in the formula (III) lowers the rubbery state elastic modulus due to its flexibility, and $R^4$ of the constituent element [b4] interferes with the cycloalkane or cycloalkene moiety of the constituent element [b5], and restricts the movement of the molecular chain. That is, the cured epoxy resin obtained by curing the combination of the constituent elements [b4] and [b5] combines a low rubbery state elastic modulus with excellent heat resistance. Further, when the epoxy resin composition is used as a matrix resin, a fiber reinforced material excellent in heat resistance and tensile strength translation rate can be easily obtained.

Preferably, the epoxy resin composition according to a fourth preferable aspect of the present invention contains at least one of the following constituent elements [a2] and [a4] as the constituent element [A], and further contains the following constituent element [C]:

[a2] an optionally substituted diglycidyl aniline;
[a4] tetraglycidyl diaminodiphenylmethane; and
[C] a monofunctional epoxy resin which is a phenyl glycidyl ether substituted with a tert-butyl group, a sec-butyl group, an isopropyl group, or a phenyl group.

A monofunctional epoxy resin which is a phenyl glycidyl ether substituted with a tert-butyl group, a sec-butyl group, an isopropyl group, or a phenyl group, which is the constituent element [C], is suitably used because such a monofunctional epoxy resin is excellent in heat resistance and tensile strength translation rate. The constituent element [C] is incorporated for the purpose of increasing the tensile strength translation rate while suppressing the deterioration of the heat resistance. Examples of such an epoxy resin include p-tert-butyl phenyl glycidyl ether, p-isopropyl phenyl glycidyl ether, p-sec-butyl phenyl glycidyl ether, and o-phenylphenol glycidyl ether.

The epoxy resin composition according to the fourth preferable aspect of the present invention preferably contains 20 to 50 parts by mass of the constituent element [C] in 100 parts by mass of the total epoxy resin. When the content of the constituent element [C] is set within this range, a cured epoxy resin capable of providing a fiber reinforced material excellent in the balance between heat resistance and tensile strength translation rate can be easily obtained.

The constituent element [a2] or [a4] exhibits more excellent heat resistance and higher tensile strength translation rate in the obtained fiber reinforced material when combined with the constituent element [C].

The constituent element [a2] is an optionally substituted diglycidyl aniline. Examples of the epoxy resin of the constituent element [a2] include diglycidyl aniline and diglycidyl toluidine.

The constituent element [a4] is tetraglycidyl diaminodiphenylmethane.

The epoxy resin composition according to the fourth preferable aspect of the present invention preferably contains the constituent elements [a2] and [a4] as the constituent element [A]. This is because the epoxy resin composition is excellent in workability as a liquid resin, and a fiber reinforced material more excellent in the balance between heat resistance and tensile strength translation rate can be easily obtained.

The epoxy resin composition according to the fourth preferable aspect of the present invention may further contain an epoxy resin other than the constituent elements [a2], [a4], and [C] as long as the effect of the present invention is not impaired, in particular, as long as the viscosity is within a tolerable range. The epoxy resin other than the constituent elements [a2], [a4], and [C] is suitably used because such an epoxy resin can adjust the balance among mechanical properties, heat resistance, and impact resistance, and process compatibility such as viscosity depending on the intended use.

Examples of the epoxy resin other than the constituent elements [a2], [a4], and [C] include bisphenol A epoxy resin, bisphenol F epoxy resin, bisphenol S epoxy resin, biphenyl epoxy resin, naphthalene epoxy resin, aminophenol epoxy resin, phenol novolac epoxy resin, an epoxy resin containing a dicyclopentadiene backbone, a phenyl glycidyl ether epoxy resin other than the constituent element [C], and a reactive diluent having an epoxy group. These may be used singly or in combination of plural kinds.

The constituent element [B] is an amine hardener or an acid anhydride hardener. Examples of an aliphatic amine hardener include isophoronediamine, diethylenetriamine, triethylenetetramine, hexamethylenediamine, N-aminoethylpiperazine, xylylenediamine, 4,4'-methylenebiscyclohexylamine, 3,3'-dimethyl-4,4'-diaminodicyclohexylmethane, cyclohexanediamine, 1,3-bisaminomethylcyclohexane, and an aliphatic polyamine having an alkylene glycol structure. Examples of the alkylene glycol structure include polyoxyethylene, polyoxypropylene, and copolymers of polyoxyethylene and polyoxypropylene. Among them, an aliphatic polyamine having an amino group at the terminal is suitably used because such an aliphatic polyamine is excellent in reactivity with an epoxy resin, easily incorporated into a network with an epoxy resin, and improves the tensile strength translation rate of the fiber reinforced material. Examples of the aliphatic polyamine having an amino group at the terminal include aliphatic polyamines having a 2-aminopropyl ether structure, a 2-aminoethyl ether structure, or a 3-aminopropyl ether structure.

Examples of an aromatic amine hardener include metaphenylenediamine, diaminodiphenylmethane, diethyltoluenediamine, 4,4'-diamino-3,3'-diethyldiphenylmethane, 4,4'-diamino-3,3'-dimethyldiphenylmethane, 4,4'-diamino-3,3',5,5'-tetramethyldiphenylmethane, and 4,4'-diamino-3,3',5,5'-tetraethyldiphenylmethane.

In the epoxy resin composition according to the fourth preferable aspect of the present invention, the constituent element [B] is preferably an acid anhydride hardener. The acid anhydride hardener is preferable because it combines low viscosity of the epoxy resin composition with heat resistance of the cured resin in a well-balanced manner.

Examples of the acid anhydride hardener include methyltetrahydrophthalic anhydride, hexahydrophthalic anhydride, methylhexahydrophthalic anhydride, tetrahydrophthalic anhydride, methyl nadic anhydride, maleic anhydride, and succinic anhydride.

The epoxy resin composition according to the fourth preferable aspect of the present invention preferably contains a compound having a norbornene backbone or a norbornane backbone as the constituent element [B]. An acid anhydride having a norbornene backbone or a norbornane backbone is suitably used because steric effects produced by the backbone increase the polymer chain confinement, and a fiber reinforced material more excellent in heat resistance and tensile strength translation rate can be easily obtained. Specific examples of the acid anhydride having a norbornene backbone or a norbornane backbone include methyl endomethylene tetrahydrophthalic anhydride, endomethylene tetrahydrophthalic anhydride, methyl bicycloheptane dicarboxylic anhydride, and bicycloheptane dicarboxylic anhydride.

When an acid anhydride is used as a hardener, an accelerator is generally used in combination. As the accelerator, an imidazole accelerator, a DBU salt, a tertiary amine, a Lewis acid or the like is used.

In the epoxy resin composition according to the fourth preferable aspect of the present invention, the constituent element [B] is preferably an amine hardener, and the epoxy resin composition preferably contains the following constituent element [b1] as the constituent element [B]:

[b1] an aromatic diamine having a substituent at an ortho position of an amino group or a cycloalkyldiamine having a substituent on a carbon atom adjacent to a carbon atom having an amino group.

An aromatic diamine having a substituent at an ortho position of an amino group or a cycloalkyldiamine having a substituent on a carbon atom adjacent to a carbon atom having an amino group is suitably used because the constituent element [b1] in combination with the constituent element [a2] or [a4] and the constituent element [C] increases the polymer chain confinement due to steric effects, and a fiber reinforced material more excellent in heat resistance and tensile strength translation rate can be easily obtained. Specific examples of the hardener include diethyltoluenediamine, 4,4'-diamino-3,3'-diethyldiphenylmethane, 4,4'-diamino-3,3'-dimethyldiphenylmethane, 4,4'-diamino-3,3',5,5'-tetramethyldiphenylmethane, 4,4'-diamino-3,3',5,5'-tetraethyldiphenylmethane, and 2,2'-dimethyl-4,4'-methylenebiscyclohexylamine. Among them, 3,3'-dimethyl-4,4'-diaminodicyclohexylmethane and diethyltoluenediamine are preferable.

These amine hardeners may be used singly or in combination.

The epoxy resin composition according to the fourth preferable aspect of the present invention preferably further contains an aliphatic polyamine having an alkylene glycol structure as the constituent element [B]. The combination of an aromatic diamine having a substituent at an ortho position of an amino group or a cycloalkyldiamine having a substituent on a carbon atom adjacent to a carbon atom having an amino group with an aliphatic polyamine having an alkylene glycol structure makes it easier to improve the balance between the viscosity of the epoxy resin composition and the glass transition temperature of the cured product, and the rubbery state elastic modulus.

The epoxy resin composition according to the fourth preferable aspect of the present invention preferably further contains isophoronediamine as the constituent element [B]. When the epoxy resin composition contains isophoronediamine in addition to the cycloalkyldiamine having a substituent on a carbon atom adjacent to a carbon atom having an amino group, a fiber reinforced material excellent in tensile strength translation rate can be easily obtained, and the process stability is improved. This is because the addition of isophoronediamine suppresses the phenomenon of salt formation by the amine in the resin bath with carbon dioxide in the air (Amine Blush), and improves the process stability.

The total amount of the constituent element [B] is preferably 0.6 to 1.2 equivalents in terms of the active hydrogen equivalent or the acid anhydride equivalent based on the epoxy groups of all the epoxy resin components contained in the epoxy resin composition. When the total amount of the constituent element [B] is set within this range, a cured epoxy resin capable of providing a fiber reinforced material excellent in the balance between heat resistance and mechanical properties can be obtained.

The reason why the epoxy resin composition according to the fourth aspect of the present invention combines heat resistance with tensile strength translation rate well, in other words, combines heat resistance with low rubbery state elastic modulus well is not clear. However, it is presumably because the substituent having potent steric effects in the constituent element [C] interferes with the curing reaction of the constituent element [a2] or [a4], and the cured product has the cross-linkage by covalent bonds and the polymer chain confinement due to steric effects in a well-balanced manner. In the cured epoxy resin composition, the aromatic ring of the constituent element [a2], as steric effects, interferes with the tert-butyl group, the isopropyl group, or the like of the constituent element [C], and restricts the movement of the molecular chain. As a result, even if the cured epoxy resin composition is low in density of cross-linkage derived from covalent bonds, the cured epoxy resin composition exhibits high heat resistance. In general, the constituent element [a4] is a component that increases the cross-linking density to improve the heat resistance. When the constituent element [a4] is used in combination with the constituent element [C], part of the epoxy resin is affected by steric effects and remains unreacted, and serves as additional steric effects. Thus, movement of the molecular chain is restricted in a state where the cross-linking density is low as in the case of the constituent element [a2]. That is, the cured epoxy resin obtained by curing the combination of the constituent element [A] including the constituent element [a2] or [a4], the constituent element [B], and the constituent element [C] combines a low rubbery state elastic modulus with a high glass transition temperature. Further, when the epoxy resin composition is used as a matrix resin, a fiber reinforced material excellent in heat resistance and tensile strength translation rate can be easily obtained.

The epoxy resin composition of the present invention is suitably used in a fiber reinforced material produced by a liquid process such as filament winding or pultrusion. The epoxy resin composition is preferably in a liquid form in order to improve the impregnating property into the reinforcing fiber bundle. More specifically, the epoxy resin composition according to the second preferable aspect of the present invention preferably has a viscosity at 25° C. of 3000 mPa·s or less, more preferably 2000 mPa·s or less. On the other hand, the epoxy resin composition according to the first, third, or fourth preferable aspect of the present invention preferably has a viscosity at 25° C. of 2000 mPa·s or less. When the viscosity is within this range, the reinforcing fiber bundle can be impregnated with the epoxy resin composition without requiring a special heating mechanism in the resin bath or dilution with an organic solvent or the like.

The epoxy resin composition of the present invention can contain a thermoplastic resin as long as the effect of the present invention is not impaired. The thermoplastic resin may be a thermoplastic resin soluble in an epoxy resin, organic particles such as rubber particles and thermoplastic resin particles, or the like.

Examples of the thermoplastic resin soluble in an epoxy resin include polyvinyl acetal resins such as polyvinyl formal and polyvinyl butyral, polyvinyl alcohol, phenoxy resin, polyamide, polyimide, polyvinyl pyrrolidone, and polysulfone.

Examples of the rubber particles include cross-linked rubber particles, and core shell rubber particles obtained by graft-polymerizing a heterogeneous polymer onto the surface of cross-linked rubber particles.

In preparing the epoxy resin composition of the present invention, for example, the components may be kneaded using a machine such as a planetary mixer or a mechanical stirrer, or the components may be mixed by hand using a beaker and a spatula.

The fiber reinforced material of the present invention is made from a cured product of the epoxy resin composition of the present invention and a reinforcing fiber. The fiber reinforced material of the present invention is preferable because it can combine heat resistance with tensile strength translation rate at a high level.

The fiber reinforced material containing a cured product of the epoxy resin composition of the present invention as a matrix resin can be obtained by integrating the epoxy resin composition of the present invention prepared by the above-mentioned method with a reinforcing fiber, and then curing the resulting product.

The reinforcing fiber used in the present invention is not particularly limited, and a glass fiber, a carbon fiber, an aramid fiber, a boron fiber, an alumina fiber, a silicon carbide fiber and the like can be used. Two or more of these fibers may be used as a mixture. Of these, a carbon fiber is preferably used because it can provide a light and stiff fiber reinforced material.

The epoxy resin composition of the present invention can be suitably used in the filament winding and pultrusion. The filament winding is a molding method of winding a reinforcing fiber on a mandrel or a liner with a resin being adhered to the reinforcing fiber, and curing the resin to give a molded article. The pultrusion is a molding method of adhering a resin to a roving of a reinforcing fiber, and continuously curing the resin while passing the roving through a mold to give a molded article. In either method, the prepared epoxy resin composition of the present invention can be put in a resin bath and used.

The fiber reinforced material made from the epoxy resin composition of the present invention is preferably used for pressure vessels, propeller shafts, drive shafts, electric cable core materials, structures of moving bodies such as automobiles, ships, and railway vehicles, and cable applications. The fiber reinforced material is particularly suitably used for the production of a pressure vessel by filament winding.

The molded article of the present invention is made from the fiber reinforced material of the present invention. The molded article of the present invention is formed by a general molding method such as hand lay-up, filament winding, pultrusion, or Resin Transfer Molding. The molded article is particularly suitably formed by the filament winding or pultrusion.

The pressure vessel of the present invention is made from the fiber reinforced material of the present invention. The pressure vessel of the present invention is preferably produced by filament winding. The filament winding is a method of winding a reinforcing fiber on a liner with a thermosetting resin composition being adhered to the reinforcing fiber, and curing the resin composition to give a molded article including a liner, and a fiber reinforced material layer that covers the liner and is made of the fiber reinforced material including the hardener for the thermosetting resin composition and the reinforcing fiber. For producing the pressure vessel, a metal liner or a liner made of a resin such as polyethylene or polyamide is used, and a desired material can be appropriately selected. In addition, the liner shape can also be appropriately selected according to the desired shape.

EXAMPLES

Hereinafter, the present invention will be described more specifically with reference to examples, but the present invention is not limited to the description of these examples.

The constituent elements used in the examples are as follows.

<Materials Used>
Constituent Element [A]
([a1]: trifunctional or higher functional aromatic epoxy resin)
[a1]-1 "Araldite (registered trademark)" MY0500 (triglycidyl-p-aminophenol, manufactured by Huntsman Japan KK)
[a1]-2 "Araldite (registered trademark)" MY0510 (triglycidyl-p-aminophenol, manufactured by Huntsman Japan KK)
[a1]-3 "Araldite (registered trademark)" PY307-1 (phenol novolac epoxy resin, manufactured by Huntsman Japan KK)
[a1]-4 "jER (registered trademark)" 630 (p-aminophenol epoxy resin, manufactured by Mitsubishi Chemical Corporation)
[a1]-5 "TETRAD (registered trademark)"-X (N,N,N',N'-tetraglycidyl-m-xylenediamine, manufactured by MITSUBISHI GAS CHEMICAL COMPANY, INC.)
([a2]: optionally substituted glycidyl aniline)
[a2]-1 GOT (N,N'-diglycidyl orthotoluidine, manufactured by Nippon Kayaku Co., Ltd.)
[a2]-2 GAN (N,N'-diglycidyl aniline, manufactured by Nippon Kayaku Co., Ltd.)
([a3]: bifunctional or higher functional epoxy resin having fluorene structure)
[a3]-1 "OGSOL (registered trademark)" PG-100 (fluorene epoxy resin, manufactured by Osaka Gas Chemicals Co., Ltd.)
[a3]-2 "OGSOL (registered trademark)" EG-200 (fluorene epoxy resin, manufactured by Osaka Gas Chemicals Co., Ltd.)
([a4]: tetraglycidyl diphenyldiaminomethane)→[a4] is incorporated into [a1].
[a4]-1 "SUMI-EPDXY (registered trademark)" ELM434 (tetraglycidyl diaminodiphenylmethane, manufactured by Sumitomo Chemical Co., Ltd.)
[a4]-2 "Araldite (registered trademark)" MY721 (N,N,N',N'-tetraglycidyl-4,4'-diaminodiphenylmethane, manufactured by Huntsman Japan KK)
(Other Constituent Elements [A])
[A]-1 "jER (registered trademark)" 825 (liquid bisphenol A epoxy resin, manufactured by Mitsubishi Chemical Corporation)
[A]-2 "jER (registered trademark)" 828 (liquid bisphenol A epoxy resin, manufactured by Mitsubishi Chemical Corporation)
[A]-3 "jER (registered trademark)" 806 (liquid bisphenol F epoxy resin, manufactured by Mitsubishi Chemical Corporation)
[A]-4 "jER (registered trademark)" 830 (liquid bisphenol F epoxy resin, manufactured by Mitsubishi Chemical Corporation)
[A]-5 "jER (registered trademark)" YDF2001 (solid bisphenol F epoxy resin, manufactured by NIPPON STEEL & SUMIKIN CHEMICAL CO., LTD.)
[A]-6 "jER (registered trademark)" YX4000 (biphenyl epoxy resin, manufactured by Mitsubishi Chemical Corporation)
[A]-7 "Epikote (registered trademark)" YX4000H (biphenyl epoxy resin, manufactured by Mitsubishi Chemical Corporation)
[A]-8 "HyPox (registered trademark)" RA95 (elastomer-modified bisphenol A epoxy resin, manufactured by CVC Thermoset Specialties)

Constituent Element [B]
([b1]: sterically hindered diamine)
[b1]-1 "Aradur (registered trademark)" 5200 (diethyltoluenediamine, manufactured by Huntsman Japan KK)
[b1]-2 "Etacure (registered trademark)" 100 (diethyltoluenediamine, manufactured by Albemarle)
[b1]-3 "jER Cure (registered trademark)" W (diethyltoluenediamine, manufactured by Mitsubishi Chemical Corporation)
[b1]-4 "KAYABOND (registered trademark)" C-300S (4,4'-diamino-3,3',5,5'-tetraethyldiphenylmethane, manufactured by Nippon Kayaku Co., Ltd.)
[b1]-5 2,6-diaminotoluene (manufactured by Tokyo Chemical Industry Co., Ltd.)
[b1]-6 "Baxxodur (registered trademark)" EC331 (3,3'-dimethyl-4,4'-diaminodicyclohexylmethane, manufactured by BASF Japan Ltd.)
([b2]: alicyclic amine)
[b2]-1 "Baxxodur (registered trademark)" EC201 (isophoronediamine, manufactured by BASF Japan Ltd.)
[b2]-2 4,4'-methylenebiscyclohexylamine (manufactured by Tokyo Chemical Industry Co., Ltd.)
[b2]-3 1,3-bisaminomethylcyclohexane (manufactured by MITSUBISHI GAS CHEMICAL COMPANY, INC.)
[b2]-4 N-cyclohexyl-1,3-propanediamine (manufactured by Tokyo Chemical Industry Co., Ltd.)
([b3]: aromatic monoamine)
(Aromatic Monoamine Represented by General Formula (I))
[b3]-1 4-aminodiphenyl ether (active hydrogen equivalent: 93)
[b3]-2 4-aminodiphenylmethane (active hydrogen equivalent: 92)
[b3]-3 2-aminodiphenylsulfone (active hydrogen equivalent: 117)
(Aromatic Monoamine Represented by General Formula (II))
[b3]-4 p-toluidine (active hydrogen equivalent: 54)
[b3]-5 3-methylaniline (active hydrogen equivalent: 54)
[b3]-6 3-ethylaniline (active hydrogen equivalent: 61)
[b3]-7 3-isopropylaniline (active hydrogen equivalent: 66)
([b4]: acid anhydride having flexible group)
[b4]-1 "RIKACID (registered trademark)" DDSA (3-dodecenylsuccinic anhydride, manufactured by New Japan Chemical Co., Ltd.)
Constituent Element [b5]: General Acid Anhydride
[b5]-1 HN2200 (methyltetrahydrophthalic anhydride, manufactured by Hitachi Chemical Co., Ltd.)
[b5]-2 "KAYAHARD (registered trademark)" MCD (methyl nadic anhydride, manufactured by Nippon Kayaku Co., Ltd.)
(Other Constituent Elements [B])
[B]-1 3,3'-DAS (3,3'-diaminodiphenylsulfone, manufactured by Mitsui Fine Chemicals, Inc.)
[B]-2 "SEIKACURE (registered trademark)" S (4,4'-diaminodiphenylsulfone, manufactured by SEIKA CORPORATION)
[B]-3 4-aminodiphenylamine
[B]-4 3,3'-diaminodiphenylsulfone (manufactured by Wakayama Seika Kogyo Co., Ltd.)
[B]-5 "JEFFAMINE (registered trademark)" D230 (polypropylene glycol diamine, manufactured by Huntsman Japan KK)
[B]-6 "JEFFAMINE (registered trademark)" D400 (polypropylene glycol diamine, manufactured by Huntsman Japan KK)

Constituent Element [C]

[C]-1 "Denacol (registered trademark)" EX-146 (p-tert-butyl phenyl glycidyl ether, manufactured by Nagase ChemteX Corporation)

[C]-2 "Denacol (registered trademark)" EX-142 (o-phenylphenol glycidyl ether, manufactured by Nagase ChemteX Corporation) Epoxy resin other than constituent elements [A] and [C]

[A']-1 "CELLOXIDE (registered trademark)" 2021P (alicyclic epoxy resin, manufactured by Daicel Corporation)

[A']-2 "Epotohto (registered trademark)" YH-300 (aliphatic polyglycidyl ether, manufactured by NIPPON STEEL & SUMIKIN CHEMICAL CO., LTD.)

[A']-3 "Denacol (registered trademark)" EX-141 (phenyl glycidyl ether, manufactured by Nagase ChemteX Corporation)

Accelerator [E]

[E]-1 DY070 (imidazole, manufactured by Huntsman Japan KK)

[E]-2 "Curezol (registered trademark)" 1B2MZ (imidazole, manufactured by Shikoku Chemicals Corporation)

[E]-3 "KAOLIZER (registered trademark)" No. 20 (N,N-dimethylbenzylamine, manufactured by Kao Corporation)

[E]-4 "U-CAT (registered trademark)" SA102 (DBU-octylate, San-Apro Ltd.)

[E]-5 "Curezol (registered trademark)" 2E4MZ (2-ethyl-4-methylimidazole, Shikoku Chemicals Corporation)

Other Components [F]

[F]-1 "Kane Ace (registered trademark)" MX-416 (core shell rubber 25% by mass/"Araldite (registered trademark)" MY721 (constituent element [A]) 75% by mass, manufactured by Kaneka Corporation)

[F]-2 DIC-TBC (4-t-butylcatechol, manufactured by DIC Corporation)

Reinforcing Fiber

"Torayca (registered trademark)" T700SC-12K-50C (tensile strength: 4.9 GPa, manufactured by Toray Industries, Inc.)

<Method for Preparing Epoxy Resin Composition>

As the main ingredient of the epoxy resin composition, the epoxy resin of the constituent element [A] and, if necessary, the constituent element [C] and other epoxy resins were charged into a beaker, and the contents were heated to 80° C. and kneaded with heating for 30 minutes. Then, as a hardener, the constituent element [B] and, if necessary, other hardeners and accelerators were charged into another beaker. The solid hardener was previously kneaded at a temperature of 25 to 120° C. for 30 to 60 minutes so as to be dissolved in the liquid hardener.

Then, the temperature was lowered to 30° C. or lower with the contents being continuously kneaded, and the main ingredient and the hardener were mixed and stirred for 10 minutes to give an epoxy resin composition.

The content ratios of the components in each of the examples and comparative examples are shown in Tables 1 to 13.

<Viscosity Measurement of Epoxy Resin Composition>

The viscosity of the epoxy resin composition prepared according to <Method for preparing epoxy resin composition> was measured using an E-type viscometer (manufactured by Toki Sangyo Co., Ltd., TVE-30H) equipped with a standard cone rotor (1° 34'×R24) at a rotation speed of 10 revolutions/min according to "Method for measuring viscosity by cone-plate type rotational viscometer" in JIS Z 8803 (2011). After being prepared, the epoxy resin composition was charged into an apparatus set at 25° C., and the viscosity after 1 minute was measured.

<Method for Producing Fiber Reinforced Material>

The epoxy resin composition prepared according to <Method for preparing epoxy resin composition> was impregnated into a sheet-shaped carbon fiber "Torayca (registered trademark)" T700S-12K-50C (manufactured by Toray Industries, Inc., areal weight: 150 g/m$^2$) arranged in one direction at room temperature to give an epoxy resin-impregnated carbon fiber sheet. Then, 8 sheets were stacked so that the fibers would be arranged in the same direction, and the resulting laminate was sandwiched between molds set to a thickness of 1 mm with a metal spacer. The molds were subjected to thermal curing for 2 hours using a press machine. Then, the molds were taken out of the press machine, and further thermally cured in an oven for 4 hours to give a fiber reinforced material. As for the curing conditions, the following A or B was applied depending on the hardener used.

Curing conditions A: Curing at 100° C. for 2 hours, and then curing at 150° C. for 4 hours Curing conditions B: Curing at 80° C. for 2 hours, and then curing at 110° C. for 4 hours <Method for Evaluating Properties of Cured Resin>

The epoxy resin composition was defoamed in a vacuum, and then cured in a mold set to a thickness of 2 mm with a 2-mm thick "TEFLON (registered trademark)" spacer to give a plate-shaped cured resin having a thickness of 2 mm. As for the curing conditions, the following A or B was applied depending on the hardener used.

Curing conditions A: Curing at 100° C. for 2 hours, and then curing at 150° C. for 4 hours Curing conditions B: Curing at 80° C. for 2 hours, and then curing at 110° C. for 4 hours A test piece having a width of 12.7 mm and a length of 45 mm was cut from the cured resin. DMA measurement was carried out in the temperature range of 30 to 250° C. under conditions of a torsional vibration frequency of 1.0 Hz and a temperature ramp rate of 5.0° C./min using a viscoelasticity measuring device (ARES, manufactured by TA Instruments Inc.), and the glass transition temperature and the rubbery state elastic modulus were read. The glass transition temperature is the temperature at the intersection of the tangent in the glass state and the tangent in the transition state in the storage elastic modulus G' curve. The rubbery state elastic modulus is a storage elastic modulus in a region in which the storage elastic modulus is flat in a temperature region above the glass transition temperature. Herein, the storage elastic modulus at a temperature 40° C. above the glass transition temperature is employed.

<Tensile Strength Measurement of Fiber Reinforced Material>

From the fiber reinforced material produced according to <Method for producing fiber reinforced material>, a test piece having a width of 12.7 mm and a length of 229 mm was cut, and a glass fiber-reinforced plastic tab of 1.2 mm, 50 mm in length was bonded to both ends of the test piece. The tensile strength of the test piece was measured at a crosshead speed of 1.27 mm/min using an Instron universal testing machine (manufactured by Instron) according to ASTM D 3039. The average value of measured values of samples (number of samples=6) was taken as the tensile strength.

The tensile strength translation rate was calculated according to (tensile strength of fiber reinforced material)/(tensile strength of reinforcing fiber strands×fiber volume content)×100.

The fiber volume content was measured according to ASTM D 3171, and the measured value was used.

<Glass Transition Temperature Measurement of Fiber Reinforced Material>

A small piece (5 to 10 mg) was collected from the fiber reinforced material produced according to <Method for producing fiber reinforced material>, and the intermediate point glass transition temperature (Tmg) was measured according to JIS K 7121 (1987). The measurement was carried out in a Modulated mode at a temperature ramp rate of 5° C./min under a nitrogen gas atmosphere using a differential scanning calorimeter DSC Q2000 (manufactured by TA Instruments Inc.).

Example 1

Using 25 parts by mass of "SUMI-EPDXY (registered trademark)" ELM434, 30 parts by mass of GAN, and 45 parts by mass of "jER (registered trademark)" 828 as the constituent element [A], and 19 parts by mass of "Aradur (registered trademark)" 5200 and 10 parts by mass of "Baxxodur (registered trademark)" EC201 as the constituent element [B], an epoxy resin composition was prepared according to <Method for preparing epoxy resin composition>.

The epoxy resin composition was cured by the above-mentioned method to prepare a cured product, and the dynamic viscoelasticity was evaluated. As a result, the glass transition temperature was 131° C. and the rubbery state elastic modulus was 8.2 MPa, and the epoxy resin composition was satisfactory in heat resistance and rubbery state elastic modulus.

A fiber reinforced material was produced from the obtained epoxy resin composition according to <Method for producing fiber reinforced material> to give a fiber reinforced material having a fiber volume content of 65%. The tensile strength of the obtained fiber reinforced material was measured by the above-mentioned method, and the tensile strength translation rate was calculated. As a result, the tensile strength translation rate was 78%. In addition, the glass transition temperature of the obtained fiber reinforced material was 132° C.

Examples 2 to 61

An epoxy resin composition, a cured epoxy resin, and a fiber reinforced material were produced by the same method as in Example 1 (except that the curing conditions were the curing conditions A or B shown in the tables) except that the resin composition was changed as shown in Tables 1 to 10. The evaluation results are shown in Tables 1 to 10. All of the obtained cured epoxy resins showed satisfactory heat resistance and rubbery state elastic modulus. The tensile strength translation rate and heat resistance of the obtained fiber reinforced material were also satisfactory.

Comparative Example 1

An epoxy resin composition and a cured resin were produced in the same manner as in Example 1 except that the resin composition was changed as shown in Table 11. The evaluation results are shown in Table 11. The glass transition temperature was 115° C., and the rubbery state elastic modulus was as high as 11.0 MPa. As a result, the tensile strength translation rate of the fiber reinforced material was 72%, and was insufficient.

Comparative Example 2

An epoxy resin composition and a cured resin were produced in the same manner as in Example 1 except that the resin composition was changed as shown in Table 11. The evaluation results are shown in Table 11. The glass transition temperature was 146° C. and satisfactory, but the rubbery state elastic modulus was as high as 15.2 MPa. As a result, the tensile strength translation rate of the fiber reinforced material was 68%, and was insufficient.

Comparative Example 3

An epoxy resin composition and a cured resin were produced in the same manner as in Example 1 except that the resin composition was changed as shown in Table 11. The evaluation results are shown in Table 11. The glass transition temperature was 133° C. and satisfactory, but the rubbery state elastic modulus was as high as 14.1 MPa. As a result, the tensile strength translation rate of the fiber reinforced material was 68%, and was insufficient.

Comparative Example 4

An epoxy resin composition and a cured resin were produced in the same manner as in Example 1 except that the resin composition was changed as shown in Table 11. The evaluation results are shown in Table 11. The glass transition temperature was 131° C. and satisfactory, but the rubbery state elastic modulus was as high as 12.9 MPa. As a result, the tensile strength translation rate of the fiber reinforced material was 71%, and was insufficient.

Comparative Example 5

An epoxy resin composition and a cured resin were produced in the same manner as in Example 13 except that the resin composition was changed as shown in Table 12. The evaluation results are shown in Table 12. The rubbery state elastic modulus was 9.5 MPa and was satisfactory, but the glass transition temperature was 92° C. As a result, the fiber reinforced material had a glass transition temperature of 94° C., and was insufficient in heat resistance.

Comparative Example 6

An epoxy resin composition and a cured resin were produced in the same manner as in Example 13 except that the resin composition was changed as shown in Table 12. The evaluation results are shown in Table 12. The rubbery state elastic modulus was 7.8 MPa or less and was satisfactory, but the glass transition temperature was 90° C. As a result, the fiber reinforced material had a glass transition temperature of 93° C., and was insufficient in heat resistance.

Comparative Example 7

An epoxy resin composition and a cured resin were produced in the same manner as in Example 13 except that the resin composition was changed as shown in Table 12. The evaluation results are shown in Table 12. The glass transition temperature was 157° C. and the epoxy resin composition was satisfactory in heat resistance, but the rubbery state elastic modulus was as high as 13.0 MPa. As a result, the tensile strength translation rate of the fiber reinforced material was 71%, and was insufficient.

Comparative Example 8

An epoxy resin composition and a cured resin were produced in the same manner as in Example 13 except that the resin composition was changed as shown in Table 12. The solid amine was previously dissolved in the liquid amine, and then mixed with the epoxy resin. The evaluation results are shown in Table 12. The glass transition temperature was 165° C. and the epoxy resin composition was satisfactory in heat resistance, but the rubbery state elastic modulus was as high as 15.0 MPa. As a result, the tensile strength translation rate of the fiber reinforced material was 67%, and was insufficient.

Comparative Example 9

An epoxy resin composition and a cured resin were produced in the same manner as in Example 31 except that the resin composition was changed as shown in Table 12. The evaluation results are shown in Table 12. The glass transition temperature was 134° C. and satisfactory, but the rubbery state elastic modulus was as high as 12.1 MPa. As a result, the tensile strength translation rate of the fiber reinforced material was 71%, and was insufficient.

Comparative Example 10

An epoxy resin composition and a cured resin were produced in the same manner as in Example 31 except that the resin composition was changed as shown in Table 12. The evaluation results are shown in Table 12. The rubbery state elastic modulus was 4.0 MPa and was satisfactory, but the glass transition temperature was 73° C. As a result, the fiber reinforced material had a glass transition temperature of 75° C., and was insufficient in heat resistance.

Comparative Example 11

An epoxy resin composition and a cured resin were produced in the same manner as in Example 35 except that the resin composition was changed as shown in Table 13. The evaluation results are shown in Table 13. The glass transition temperature was 116° C. and satisfactory, but the rubbery state elastic modulus was as high as 12.4 MPa. As a result, the tensile strength translation rate of the fiber reinforced material was 69%, and was insufficient.

Comparative Example 12

An epoxy resin composition and a cured resin were produced in the same manner as in Example 35 except that the resin composition was changed as shown in Table 13. The evaluation results are shown in Table 13. The glass transition temperature was 136° C. and satisfactory, but the rubbery state elastic modulus was as high as 11.8 MPa. As a result, the tensile strength translation rate of the fiber reinforced material was 69%, and was insufficient.

Comparative Example 13

An epoxy resin composition and a cured resin were produced in the same manner as in Example 35 except that the resin composition was changed as shown in Table 13. The evaluation results are shown in Table 13. The glass transition temperature was 125° C. and satisfactory, but the rubbery state elastic modulus was as high as 11.0 MPa. As a result, the tensile strength translation rate of the fiber reinforced material was 70%, and was insufficient.

Comparative Example 14

An epoxy resin composition and a cured resin were produced in the same manner as in Example 35 except that the resin composition was changed as shown in Table 13. The evaluation results are shown in Table 13. The rubbery state elastic modulus was 6.7 MPa and was satisfactory, but the glass transition temperature was 66° C. As a result, the fiber reinforced material had a glass transition temperature of 68° C., and was insufficient in heat resistance.

Comparative Example 15

An epoxy resin composition and a cured resin were produced in the same manner as in Example 55 except that the resin composition was changed as shown in Table 13. The evaluation results are shown in Table 13. The rubbery state elastic modulus was 3.3 MPa and was satisfactory, but the glass transition temperature was 86° C. As a result, the fiber reinforced material had a glass transition temperature of 89° C., and was insufficient in heat resistance.

Comparative Example 16

An epoxy resin composition and a cured resin were produced in the same manner as in Example 55 except that the resin composition was changed as shown in Table 13. The evaluation results are shown in Table 13. The glass transition temperature was 145° C. and satisfactory, but the rubbery state elastic modulus was as high as 13.2 MPa. As a result, the tensile strength translation rate of the fiber reinforced material was 70%, and was insufficient.

Comparative Example 17

An epoxy resin composition and a cured resin were produced in the same manner as in Example 55 except that the resin composition was changed as shown in Table 13. The evaluation results are shown in Table 13. The rubbery state elastic modulus was 5.2 MPa and was satisfactory, but the glass transition temperature was 85° C. As a result, the fiber reinforced material had a glass transition temperature of 87° C., and was insufficient in heat resistance.

Comparative Example 18

An epoxy resin composition and a cured resin were produced in the same manner as in Example 55 except that the resin composition was changed as shown in Table 13. The evaluation results are shown in Table 13. The rubbery state elastic modulus was 6.4 MPa and was satisfactory, but the glass transition temperature was 70° C. As a result, the fiber reinforced material had a glass transition temperature of 72° C., and was insufficient in heat resistance.

Comparative Example 19

An epoxy resin composition was produced according to the method described in Example 2 of Patent Document 1 (Published Japanese Translation No. 2015-508125). The obtained cured resin had a high glass transition temperature of 170° C., but had a high rubbery state elastic modulus of 16.9 MPa (Table 14). This epoxy resin composition had a high viscosity, and did not impregnate into the fiber by <Method for producing fiber reinforced material>. As a result, a large amount of voids were produced in the fiber reinforced material. Therefore, the epoxy resin composition was heated to 70° C. for rapid impregnation to give an epoxy resin-impregnated carbon fiber sheet. Then, a fiber reinforced material was obtained in the same manner as in <Method for producing fiber reinforced material>. The tensile strength translation rate of the obtained fiber reinforced material was 65%, and was insufficient.

Comparative Example 20

An epoxy resin composition was produced according to the method described in Example 9 of Patent Document 2 (Japanese Patent Laid-open Publication No. 2010-150311). The cured resin obtained by curing the epoxy resin composition had a satisfactory glass transition temperature of 180° C., but had a high rubbery state elastic modulus of 14.2 MPa (Table 14). As a result, the tensile strength translation rate of the fiber reinforced material was 69%, and was insufficient.

Comparative Example 21

An epoxy resin composition was produced according to the method described in Example 15 of Patent Document 2 (Japanese Patent Laid-open Publication No. 2010-150311). The cured resin obtained by curing the epoxy resin composition had a high glass transition temperature of 185° C., but had a high rubbery state elastic modulus of 16.0 MPa (Table 14). As a result, the tensile strength translation rate of the fiber reinforced material was 65%, and was insufficient.

Comparative Example 22

Using the resin and the hardener described in Example 1 of Patent Document 6 (Published Japanese Translation No. 2008-508113), an epoxy resin composition was produced according to <Method for preparing epoxy resin composition> since the patent document does not describe the conditions for preparing the epoxy resin composition. The cured resin obtained by curing the epoxy resin composition had a high glass transition temperature of 182° C., but had a high rubbery state elastic modulus of 19.2 MPa (Table 14). Since this epoxy resin composition had a high viscosity, an epoxy resin-impregnated carbon fiber sheet was obtained in the same manner as in Comparative Example 5. Then, a fiber reinforced material was obtained in the same manner as in <Method for producing fiber reinforced material>. The tensile strength translation rate of the obtained fiber reinforced material was 63%, and was insufficient.

Comparative Example 23

An epoxy resin composition was produced according to the method described in Example 6 of Patent Document 5 (Japanese Patent Laid-open Publication No. 2001-323046). The cured resin obtained by curing the epoxy resin composition had a high glass transition temperature of 173° C., but had a very high rubbery state elastic modulus of 18.0 MPa (Table 14). This epoxy resin composition had a very high viscosity, and no epoxy resin-impregnated carbon fiber sheet was obtained by the method shown in <Method for producing fiber reinforced material> or Comparative Example 5. Accordingly, the epoxy resin composition was dissolved in acetone, and the resulting liquid resin was impregnated into a carbon fiber and then dried under reduced pressure to distill off acetone, whereby an epoxy resin-impregnated carbon fiber sheet was produced. Then, a fiber reinforced material was obtained in the same manner as in <Method for producing fiber reinforced material>. The tensile strength translation rate of the obtained fiber reinforced material was 63%, and was insufficient.

Comparative Example 24

An epoxy resin composition (base resin composition) was produced according to the method described in Example 3 of Patent Document 6 (Published Japanese Translation No. 2008-508113). The cured resin obtained by curing the epoxy resin composition had a high glass transition temperature of 140° C., but had a very high rubbery state elastic modulus of 13.8 MPa (Table 14). A fiber reinforced material was produced from the obtained epoxy resin composition, and subjected to a tensile test. As a result, the tensile strength translation rate was 70%, and was insufficient.

Comparative Example 25

An epoxy resin composition was produced according to the method described in Example 4 of Patent Document 7 (Japanese Patent Laid-open Publication No. 2012-56980). The obtained cured resin had a satisfactory glass transition temperature of 128° C., but had a high rubbery state elastic modulus of 13.2 MPa. (Table 15) As a result, the tensile strength translation rate of the fiber reinforced material was 70%, and was insufficient.

Comparative Example 26

An epoxy resin composition was produced according to the method described in Example 7 of Patent Document 8 (Japanese Patent Laid-open Publication No. 2015-3938). The obtained cured resin had a high glass transition temperature of 184° C., but had a very high rubbery state elastic modulus of 18.8 MPa. (Table 15) As a result, the tensile strength translation rate of the fiber reinforced material was 65%, and was insufficient.

Comparative Example 27

An epoxy resin composition was produced according to the method described in Example 2 of Patent Document 9 (Japanese Patent Laid-open Publication No. 2013-1711). The obtained cured resin had a satisfactory glass transition temperature of 121° C., but had a high rubbery state elastic modulus of 13.0 MPa. (Table 15) As a result, the tensile strength translation rate of the fiber reinforced material was 70%, and was insufficient.

Comparative Example 28

An epoxy resin composition was produced according to the method described in Example 1 of Patent Document 10 (Japanese Patent Laid-open Publication No. 2005-120127). The obtained cured resin had a high glass transition temperature of 203° C., but had a very high rubbery state elastic modulus of 25.0 MPa (Table 15). This epoxy resin composition had a high viscosity, and did not impregnate into the fiber by <Method for producing fiber reinforced material>. As a result, a large amount of voids were produced in the fiber reinforced material. Therefore, the epoxy resin composition was heated to 70° C. for impregnation to give an epoxy resin-impregnated carbon fiber sheet. Then, a fiber reinforced material was obtained in the same manner as in <Method for producing fiber reinforced material>. The tensile strength translation rate of the obtained fiber reinforced material was 61%, and was insufficient.

Comparative Example 29

An epoxy resin composition (base resin composition) was produced according to the method described in Example 14 of Patent Document 11 (Japanese Patent Laid-open Publication No. 2010-59225). The cured resin obtained by curing the epoxy resin composition had a high glass transition temperature of 193° C., but had a very high rubbery state elastic modulus of 21.1 MPa (Table 15). This epoxy resin composition had a very high viscosity, and no epoxy resin-impregnated carbon fiber sheet was obtained by the method shown in <Method for producing fiber reinforced material> or Comparative Example 28. Accordingly, the epoxy resin composition was dissolved in acetone, and the resulting liquid resin was impregnated into a carbon fiber and then dried under reduced pressure to distill off acetone, whereby an epoxy resin-impregnated carbon fiber sheet was produced. Then, a fiber reinforced material was obtained in the same manner as in <Method for producing fiber reinforced material>. The tensile strength translation rate of the obtained fiber reinforced material was 61%, and was insufficient.

Comparative Example 30

An epoxy resin composition was produced according to the method described in Example 6 of Patent Document 4 (Japanese Patent No. 4687167). The cured resin obtained by curing the epoxy resin composition had a glass transition temperature of 105° C., but had a high rubbery state elastic modulus of 11.2 MPa (Table 15). Since this epoxy resin composition had a high viscosity, an epoxy resin-impregnated carbon fiber sheet was obtained in the same manner as in Comparative Example 29. Then, a fiber reinforced material was obtained in the same manner as in <Method for producing fiber reinforced material>. The tensile strength translation rate of the obtained fiber reinforced material was 70%, and was insufficient.

Comparative Example 31

An epoxy resin composition was produced according to the method described in Example 18 of Patent Document 12 (Japanese Patent Laid-open Publication No. 2012-67190). The cured resin obtained by curing the epoxy resin composition had a glass transition temperature of 169° C., but had a high rubbery state elastic modulus of 15.0 MPa (Table 16). Since this epoxy resin composition had a very high viscosity, an epoxy resin-impregnated carbon fiber sheet was obtained in the same manner as in Comparative Example 29. Then, a fiber reinforced material was obtained in the same manner as in <Method for producing fiber reinforced material>. The tensile strength translation rate of the obtained fiber reinforced material was 67%, and was insufficient.

Comparative Example 32

An epoxy resin composition was produced according to the method described in Example 5 of Patent Document 13 (International Publication No. 2011/118106). The cured resin obtained by curing the epoxy resin composition had a glass transition temperature of 162° C., but had a high rubbery state elastic modulus of 13.2 MPa (Table 16). Since this epoxy resin composition had a very high viscosity, an epoxy resin-impregnated carbon fiber sheet was obtained in the same manner as in Comparative Example 29. Then, a fiber reinforced material was obtained in the same manner as in <Method for producing fiber reinforced material>. The tensile strength translation rate of the obtained fiber reinforced material was 72%, and was insufficient.

Comparative Example 33

An epoxy resin composition was produced according to the method described in Example 2 of Patent Document 14 (Japanese Patent Laid-open Publication No. 63-86758). The cured resin obtained by curing the epoxy resin composition had a glass transition temperature of 205° C., but had a high rubbery state elastic modulus of 19.3 MPa (Table 16). Since this epoxy resin composition had a very high viscosity, an epoxy resin-impregnated carbon fiber sheet was obtained in the same manner as in Comparative Example 29. Then, a fiber reinforced material was obtained in the same manner as in <Method for producing fiber reinforced material>. The tensile strength translation rate of the obtained fiber reinforced material was 61%, and was insufficient.

TABLE 1

| Constituent element | Component | Example 1 | Example 2 | Example 3 | Example 4 | Example 5 | Example 6 |
|---|---|---|---|---|---|---|---|
| [A] [a1] | Tetraglycidyl diaminodiphenylmethane ("SUMI-EPOXY (registered trademark)" ELM434) | 25 | 10 | 25 | 25 | 25 | 25 |
| | Triglycidyl-p-aminophenol ("Araldite (registered trademark)" MY0500) | | | | | | |
| [a2] | Diglycidyl orthotoluidine (GOT) | | | | 30 | | |
| | Diglycidyl aniline (GAN) | 30 | 30 | 30 | | 30 | 30 |
| Constituent element [A] other than [a1] and [a2] | Fluorene epoxy resin ("OGSOL (registered trademark)" PG-100) | | | | 20 | | |
| | Bis-A epoxy resin ("jER (registered trademark)" 828) | 45 | 60 | 45 | | 45 | 45 |
| | Bis-F epoxy resin ("jER (registered trademark)" 830) | | | | 25 | | |
| | Biphenyl epoxy resin ("jER (registered trademark)" YX4000) | | | | | | |
| [B] [b1] | Diethyltoluenediamine ("Aradur (registered trademark)" 5200) | 19 | 18 | | 18 | | |
| | 3,3'-Dimethyl-4,4'-diaminodicyclohexylmethane ("Baxxodur (registered trademark)" EC331) | | | 24 | | 25 | 24 |
| | 2,6-Diaminotoluene | | | | | | |
| [b2] | Isophoronediamine ("Baxxodur (registered trademark)" EC201) | 10 | 9 | 12 | 9 | | |
| | 4,4'-Methylenebiscyclohexylamine | | | | | 13 | |
| | 1,3-Bisaminomethylcyclohexane | | | | | | 11 |
| | N-Cyclohexyl-1,3-propanediamine | | | | | | |

TABLE 1-continued

| Constituent element | Component | Example 1 | Example 2 | Example 3 | Example 4 | Example 5 | Example 6 |
|---|---|---|---|---|---|---|---|
| Curing conditions | Curing conditions | A | A | A | A | A | A |
| Resin properties | Viscosity (mPa · s) | 1244 | 1203 | 1325 | 1305 | 1318 | 1337 |
| | Tg of cured product (° C.) | 131 | 116 | 125 | 138 | 130 | 129 |
| | Rubbery state elastic modulus (MPa) | 8.2 | 8.3 | 7.5 | 8.9 | 8.0 | 8.5 |
| CFRP properties | Tg (° C.) | 132 | 117 | 125 | 137 | 131 | 130 |
| | Tensile strength translation rate (%) | 78 | 77 | 78 | 76 | 78 | 77 |

TABLE 2

| Constituent element | Component | Example 7 | Example 8 | Example 9 | Example 10 | Example 11 | Example 12 |
|---|---|---|---|---|---|---|---|
| [A] [a1] | Tetraglycidyl diaminodiphenylmethane ("SUMI-EPOXY (registered trademark)" ELM434) | 25 | 30 | 50 | | 20 | 25 |
| | Triglycidyl-p-aminophenol ("Araldite (registered trademark)" MY0500) | | | | 20 | | |
| [a2] | Diglycidyl orthotoluidine (GOT) | | | | 30 | 30 | |
| | Diglycidyl aniline (GAN) | 30 | 10 | 30 | | | 30 |
| Constituent element [A] other than [a1] and [a2] | Fluorene epoxy resin ("OGSOL (registered trademark)" PG-100) | | | | | | |
| | Bis-A epoxy resin ("jER (registered trademark)" 828) | 45 | 60 | | | 25 | 45 |
| | Bis-F epoxy resin ("jER (registered trademark)" 830) | | | 20 | 25 | | |
| | Biphenyl epoxy resin ("jER (registered trademark)" YX4000) | | | | 25 | 25 | |
| [B] [b1] | Diethyltoluenediamine ("Aradur (registered trademark)" 5200) | | 18 | 23 | 20 | 20 | |
| | 3,3'-Dimethyl-4,4'-diaminodicyclohexylmethane ("Baxxodur (registered trademark)" EC331) | 26 | | | | | |
| | 2,6-Diaminotoluene | | | | | | 17 |
| [b2] | Isophoronediamine ("Baxxodur (registered trademark)" EC201) | | 9 | 11 | | | |
| | 4,4'-Methylenebiscyclohexylamine | | | | | | |
| | 1,3-Bisaminomethylcyclohexane | | | | | | 8 |
| | N-cyclohexyl-1,3-propanediamine | 12 | | | 11 | 10 | |
| Curing conditions | Curing conditions | A | A | A | A | A | A |
| Resin properties | Viscosity (mPa · s) | 1324 | 1577 | 1223 | 824 | 1203 | 1280 |
| | Tg of cured product (° C.) | 126 | 135 | 140 | 122 | 124 | 128 |
| | Rubbery state elastic modulus (MPa) | 7.3 | 9.8 | 10.0 | 5.1 | 5.1 | 8.4 |
| CFRP properties | Tg (° C.) | 128 | 136 | 139 | 122 | 125 | 129 |
| | Tensile strength translation rate (%) | 79 | 76 | 75 | 81 | 81 | 78 |

TABLE 3

| Constituent element | Component | Example 13 | Example 14 | Example 15 | Example 16 | Example 17 |
|---|---|---|---|---|---|---|
| [A] [a1] | Tetraglycidyl diaminodiphenylmethane ("Araldite (registered trademark)" MY721) | 60 | | | 60 | |
| | Triglycidyl-p-aminophenol ("jER (registered trademark)" 630) | | 60 | | | 70 |
| | N,N,N',N'-tetraglycidyl-m-xylenediamine ("TETRAD (registered trademark)"-X) | | | 60 | | |
| Constituent element [A] other than [a1] | Liquid bisphenol A epoxy resin ("jER (registered trademark)" 825) | | 40 | | | |
| | Liquid bisphenol F epoxy resin ("jER (registered trademark)" 806) | 40 | | 40 | 40 | 30 |
| | Glycidyl aniline (GAN) | | | | | |
| | Glycidyl orthotoluidine (GOT) | | | | | |

TABLE 3-continued

| Constituent element | Component | Example 13 | Example 14 | Example 15 | Example 16 | Example 17 |
|---|---|---|---|---|---|---|
| [B] [b1] | Diethyltoluenediamine ("Etacure (registered trademark)" 100) | 25.8 | | 36.1 | | 24.6 |
| | 2,2'-Dimethyl-4,4'-methylenebiscyclohexylamine ("Baxxodur (registered trademark)" EC331) | | 24.0 | | 28.5 | |
| | 4,4'-Diamino-3,3',5,5'-tetraethyldiphenylmethane ("KAYABOND (registered trademark)" C-300S) | | | | | |
| [b3] | 4-Aminodiphenyl ether | 25.8 | | | 28.5 | |
| | 4-Aminodiphenylmethane | | 36.0 | | | 36.9 |
| | 2-Aminodiphenylsulfone | | | 15.5 | | |
| Curing conditions | Curing conditions | A | A | A | A | A |
| Resin properties | Tg of cured product (° C.) | 139 | 131 | 146 | 132 | 128 |
| | Rubbery state elastic modulus (MPa) | 6.8 | 7.8 | 9.8 | 6.3 | 5.2 |
| CFRP properties | Tg (° C.) | 140 | 133 | 146 | 134 | 129 |
| | Tensile strength translation rate (%) | 80 | 78 | 75 | 81 | 82 |

TABLE 4

| Constituent element | Component | Example 18 | Example 19 | Example 20 | Example 21 | Example 22 |
|---|---|---|---|---|---|---|
| [A] [a1] | Tetraglycidyl diaminodiphenylmethane ("Araldite (registered trademark)" MY721) | | 35 | 60 | | 70 |
| | Triglycidyl-p-aminophenol ("jER (registered trademark)" 630) | | | | | |
| | N,N,N',N'-tetraglycidyl-m-xylenediamine ("TETRAD (registered trademark)"-X) | 70 | 35 | | 60 | |
| Constituent element [A] other than [a1] | Liquid bisphenol A epoxy resin ("jER (registered trademark)" 825) | | | | 10 | |
| | Liquid bisphenol F epoxy resin ("jER (registered trademark)" 806) | 30 | 30 | 20 | | |
| | Glycidyl aniline (GAN) | | | 20 | 30 | |
| | Glycidyl orthotoluidine (GOT) | | | | | 30 |
| [B] [b1] | Diethyltoluenediamine ("Etacure (registered trademark)" 100) | | 18.0 | | | 40.0 |
| | 2,2'-Dimethyl-4,4'-methylenebiscyclohexylamine ("Baxxodur (registered trademark)" EC331) | 42.7 | | 38.5 | | |
| | 4,4'-Diamino-3,3',5,5'-tetraethyldiphenylmethane ("KAYABOND (registered trademark)" C-300S) | | | | 32.8 | |
| [b3] | 4-Aminodiphenyl ether | | 18.0 | 16.5 | | |
| | 4-Aminodiphenylmethane | | 24.0 | | 32.8 | |
| | 2-Aminodiphenylsulfone | 18.3 | | | | 10.0 |
| Curing conditions | Curing conditions | A | A | A | A | A |
| Resin properties | Tg of cured product (°C.) | 130 | 126 | 133 | 120 | 134 |
| | Rubbery state elastic modulus (MPa) | 5.9 | 3.8 | 4.0 | 4.5 | 8.3 |
| CFRP properties | Tg (° C.) | 131 | 127 | 134 | 122 | 134 |
| | Tensile strength translation rate (%) | 81 | 84 | 84 | 83 | 77 |

TABLE 5

| Constituent element | Component | Example 23 | Example 24 | Example 25 | Example 26 | Example 27 | Example 28 | Example 29 | Example 30 |
|---|---|---|---|---|---|---|---|---|---|
| [A] [a1] | Tetraglycidyl diaminodiphenylmethane ("Araldite (registered trademark)" MY721) | | | 80 | 80 | 70 | | 60 | 60 |
| | Triglycidyl-p-aminophenol ("jER (registered trademark)" 630) | | | | | | 60 | | |
| | N,N',N',N'-tetraglycidyl-m-xylenediamine ("TETRAD (registered trademark)"-X) | 80 | 80 | | | | | | |
| Constituent element [A] other than [a1] | Liquid bisphenol A epoxy resin ("jER (registered trademark)" 825) | | 20 | 20 | 20 | | 10 | 20 | 20 |
| | Liquid bisphenol F epoxy resin ("jER (registered trademark)" 806) | 20 | | | | | | | |
| | Glycidyl aniline (GAN) | | | | | 30 | 30 | 20 | 20 |

TABLE 5-continued

| Constituent element | Component | Example 23 | Example 24 | Example 25 | Example 26 | Example 27 | Example 28 | Example 29 | Example 30 |
|---|---|---|---|---|---|---|---|---|---|
| [B] [b1] | Diethyltoluenediamine ("Etacure (registered trademark)" 100) | 21.0 | | | 14.3 | | | 12.8 | |
| | 2,2'-Dimethyl-4,4'-methylenebiscyclohexylamine ("Baxxodur (registered trademark)" EC331) | | | 14.4 | | | 36.1 | 17.0 | 29.4 |
| | 4,4'-Diamino-3,3',5,5'-tetraethyldiphenylmethane ("KAYABOND (registered trademark)" C-300S) | | 19.2 | | | 35.7 | | | |
| [b3] | p-Toluidine | 21.0 | | | | 15.3 | | | |
| | 3-Methylaniline | | 28.8 | | | | | 15.5 | |
| | 3-Ethylaniline | | | 33.7 | | | | 12.8 | |
| | 3-Isopropylaniline | | | | 33.3 | | | | 19.6 |
| Curing conditions | Curing conditions | A | A | A | A | A | A | A | A |
| Resin properties | Tg of cured product (° C.) | 123 | 113 | 124 | 116 | 124 | 125 | 128 | 112 |
| | Rubbery state elastic modulus (MPa) | 6.6 | 5.7 | 5.0 | 4.1 | 6.9 | 5.3 | 5.5 | 3.6 |
| CFRP properties | Tg (° C.) | 124 | 115 | 125 | 117 | 126 | 125 | 129 | 115 |
| | Tensile strength translation rate (%) | 80 | 81 | 83 | 83 | 79 | 82 | 82 | 84 |

TABLE 6

| Constituent element | Component | Example 31 | Example 32 | Example 33 | Example 34 |
|---|---|---|---|---|---|
| [A] [a3] | Fluorene epoxy resin ("OGSOL (registered trademark)" PG-100) | | | 30 | 25 |
| | Fluorene epoxy resin ("OGSOL (registered trademark)" EG-200) | 30 | | | 25 |
| Constituent element [A] other than [a3] | Liquid bisphenol A epoxy resin ("jER (registered trademark)" 828) | 70 | 70 | 50 | |
| | Liquid bisphenol F epoxy resin ("jER (registered trademark)" 830) | | | | 50 |
| | Diglycidyl aniline (GAN) | | | 25 | |
| | Tetraglycidyl diaminodiphenylmethane ("SUMI-EPOXY (registered trademark)" ELM434) | | | | 25 |
| [B] [b4] | 3-Dodecenyl succinic anhydride ("RIKACID (registered trademark)" DDSA) | 28 | 57 | 42 | 59 |
| [b5] | Methyl tetrahydrophthalic anhydride (HN-2200) | 57 | | 62 | |
| | Methyl nadic anhydride ("KAYAHARD (registered trademark)" MCD) | | 43 | | 59 |
| Accelerator | DBU-octylate ("U-CAT (registered trademark)" SA102) | 2 | 2 | 2 | 2 |
| Curing conditions | Curing conditions | A | A | A | A |
| Resin properties | Viscosity (mPa · s) | 1224 | 1810 | 751 | 1120 |
| | Glass transition temperature (° C.) | 120 | 125 | 116 | 135 |
| | Rubbery state elastic modulus (MPa) | 4.6 | 5.1 | 4.0 | 6.3 |
| CFRP properties | Tg (° C.) | 121 | 126 | 117 | 137 |
| | Tensile strength translation rate (%) | 82 | 82 | 82 | 80 |

TABLE 7

| Constituent element | Component | Example 35 | Example 36 | Example 37 | Example 38 | Example 39 | Example 40 | Example 41 |
|---|---|---|---|---|---|---|---|---|
| [A] [a2] | Diglycidyl aniline (GAN) | 50 | 60 | | 60 | 50 | 50 | 25 |
| | Diglycidyl orthotoluidine (GOT) | | | 25 | | | | |
| [a4] | Tetraglycidyl diaminodiphenylmethane ("SUMI-EPOXY (registered trademark)" ELM434) | | | | | | 15 | |
| Constituent element [A] other than [a2] and [a4] | Fluorene epoxy resin ("OGSOL (registered trademark)" PG-100) | | | | | | 25 | 25 |
| | Bis-A epoxy resin ("jER (registered trademark)" 828) | | 35 | 50 | | | | 25 |
| | Bis-F epoxy resin ("jER (registered trademark)" 830) | | | | | | | |

TABLE 7-continued

| Constituent element | Component | Example 35 | Example 36 | Example 37 | Example 38 | Example 39 | Example 40 | Example 41 |
|---|---|---|---|---|---|---|---|---|
| [C] | p-tert-Butyl phenyl glycidyl ether ("Denacol (registered trademark)" EX-146) | 15 | 40 | 25 | 40 | 35 | 25 | 25 |
| [B] | Methyl tetrahydrophthalic anhydride (HN-2200) | 119 | 100 | 90 | | 90 | 90 | 83 |
| | Methyl nadic anhydride ("KAYAHARD (registered trademark)" MCD) | | | | 106 | | | |
| Accelerator | DBU salt ("U-CAT (registered trademark)" SA102) | 2 | 2 | 2 | 2 | 2 | 2 | 2 |
| Curing conditions | Curing conditions | A | A | A | A | A | A | A |
| Resin properties | Viscosity (mPa·s) | 374 | 64 | 558 | 206 | 190 | 452 | 723 |
| | Tg of cured product (°C.) | 130 | 104 | 112 | 111 | 126 | 116 | 132 |
| | Rubbery state elastic modulus (MPa) | 10.0 | 4.6 | 5.7 | 4.7 | 5.5 | 4.3 | 6.0 |
| CFRP properties | Tg (°C.) | 132 | 106 | 114 | 113 | 127 | 118 | 133 |
| | Tensile strength translation rate (%) | 74 | 82 | 81 | 80 | 81 | 82 | 80 |

TABLE 8

| Constituent element | | Component | Example 42 | Example 43 | Example 44 | Example 45 | Example 46 | Example 47 | Example 48 |
|---|---|---|---|---|---|---|---|---|---|
| [A] | [a2] | Diglycidyl aniline (GAN) | | 30 | 30 | | | 25 | |
| | | Diglycidyl orthotoluidine (GOT) | | | | 35 | 35 | | |
| | [a4] | Tetraglycidyl diaminodiphenylmethane ("SUMI-EPOXY (registered trademark)" ELM434) | 45 | | | | | 10 | 10 |
| Constituent element [A] other than [a2] and [a4] | | Fluorene epoxy resin ("OGSOL (registered trademark)" PG-100) | | 30 | | | | | |
| | | Bis-A epoxy resin ("jER (registered trademark)" 828) | | | | 40 | | 30 | 55 |
| | | Bis-F epoxy resin ("jER (registered trademark)" 830) | | | | | 35 | 35 | |
| [C] | | p-tert-Butyl phenyl glycidyl ether ("Denacol (registered trademark)" EX-146) | 55 | 40 | | | 30 | 35 | |
| | | o-Phenyl phenyl glycidyl ether ("Denacol (registered trademark)" EX-142) | | | 30 | 30 | | | |
| Epoxy resin other than constituent elements [A] and [C] | | Phenyl glycidyl ether ("Denacol (registered trademark)" EX-141) | | | | | | | 35 |
| [B] | | Methyl tetrahydrophthalic anhydride (HN-2200) | | | | | 93 | 94 | |
| | | Methyl nadic anhydride ("KAYAHARD (registered trademark)" MCD) | 103 | 89 | 96 | | 99 | | 101 |
| Accelerator | | DBU salt ("U-CAT (registered trademark)" SA102) | 3 | | | | | | 2 |
| | | N,N-Dimethylbenzylamine ("KAOLIZER (registered trademark)" No. 20) | | 4 | 3 | 4 | 4 | | |
| | | 2-Ethyl-4-methylimidaxole ("Curezol (registered trademark)" 2E4MZ) | | | | | | 1 | |
| Curing conditions | | Curing conditions | A | A | A | A | A | A | A |
| Resin properties | | Viscosity (mPa·s) | 642 | 872 | 235 | 252 | 318 | 562 | 687 |
| | | Tg of cured product (°C.) | 97 | 125 | 115 | 109 | 124 | 128 | 97 |
| | | Rubbery state elastic modulus (MPa) | 6.5 | 5.2 | 4.2 | 4.7 | 4.8 | 5.2 | 10.0 |
| CFRP properties | | Tg (°C.) | 98 | 127 | 116 | 109 | 127 | 129 | 98 |
| | | Tensile strength translation rate (%) | 80 | 81 | 82 | 80 | 80 | 81 | 75 |

TABLE 9

| Constituent element | | Component | Example 49 | Example 50 | Example 51 | Example 52 | Example 53 | Example 54 | Example 55 |
|---|---|---|---|---|---|---|---|---|---|
| [A] | [a2] | Diglycidyl aniline (GAN) | 25 | 30 | 25 | | | 30 | |
| | [a4] | Tetraglycidyl diaminodiphenylmethane ("SUMI-EPOXY (registered trademark)" ELM434) | | | 40 | 30 | 45 | 30 | |

TABLE 9-continued

| Constituent element | Component | Example 49 | Example 50 | Example 51 | Example 52 | Example 53 | Example 54 | Example 55 |
|---|---|---|---|---|---|---|---|---|
| Constituent element [A] other than [a2] and [a4] | Fluorene epoxy resin ("OGSOL (registered trademark)" PG-100) | | | | | | 30 | |
| | Bis-A epoxy resin ("jER (registered trademark)" 828) | 50 | | 50 | 40 | | | |
| | Bis-F epoxy resin ("jER (registered trademark)" 830) | | | | | | | 100 |
| | Triglycidyl-p-aminophenol ("Araldite (registered trademark)" MY0500) | | | | | | | |
| [C] | p-tert-Butyl phenyl glycidyl ether ("Denacol (registered trademark)" EX-146) | 25 | 30 | 25 | 30 | 25 | 40 | |
| [B] | Diethyltoluenediamine ("Aradur (registered trademark)" 5200) | 25 | 29 | | 26 | 32 | 22 | |
| | Poly(propylene glycol) diamine ("JEFFAMINE (registered trademark)" D230) | | | | | | | 20.7 |
| | Poly(propylene glycol) diamine ("JEFFAMINE (registered trademark)" D400) | | | | 10 | 10 | 13 | |
| | Isophoronediamine ("Baxxodur (registered trademark)" EC201) | | | | | | | 8.9 |
| | 3,3'-Dimethyl-4,4'-diaminodicyclohexylmethane ("Baxxodur (registered trademark)" EC331) | | | 34 | | | | |
| Curing conditions | Curing conditions | A | A | B | A | A | A | A |
| Resin properties | Viscosity (mPa·s) | 872 | 857 | 1027 | 1187 | 872 | 1265 | 562 |
| | Tg of cured product (°C.) | 110 | 122 | 97 | 113 | 120 | 106 | 97 |
| | Rubbery state elastic modulus (MPa) | 4.6 | 5.1 | 3.1 | 5.3 | 4.5 | 3.4 | 9.9 |
| CFRP properties | Tg (°C.) | 111 | 124 | 98 | 115 | 123 | 107 | 98 |
| | Tensile strength translation rate (%) | 82 | 82 | 83 | 81 | 82 | 82 | 75 |

TABLE 10

| Constituent element | Component | Example 56 | Example 57 | Example 58 | Example 59 | Example 60 | Example 61 |
|---|---|---|---|---|---|---|---|
| [A] [a2] | Diglycidyl aniline (GAN) | 25 | 25 | 50 | 25 | 35 | 40 |
| [a4] | Tetraglycidyl diaminodiphenylmethane ("SUMI-EPOXY (registered trademark)" ELM434) | | | | | | 10 |
| Constituent element [A] other than [a2] and [a4] | Fluorene epoxy resin ("OGSOL (registered trademark)" PG-100) | | | | | 5 | |
| | Bis-A epoxy resin ("jER (registered trademark)" 828) | 50 | 50 | 35 | 15 | 30 | 15 |
| | Triglycidyl-p-aminophenol ("Araldite (registered trademark)" MY0500) | | | | | | |
| [C] | p-tert-Butyl phenyl glycidyl ether ("Denacol (registered trademark)" EX-146) | 25 | 25 | 15 | 60 | 30 | 25 |
| [B] | Diethyltoluenediamine ("Aradur (registered trademark)" 5200) | 16 | | | 25 | | |
| | Isophoronediamine ("Baxxodur (registered trademark)" EC201) | 8 | 12 | | | 20.1 | 15.1 |
| | 3,3'-Dimethyl-4,4'-diaminodicyclohexylmethane ("Baxxodur (registered trademark)" EC331) | | 18 | 40 | | 8.6 | 15.1 |
| Curing conditions | Curing conditions | A | B | B | A | B | B |
| Resin properties | Viscosity (mPa·s) | 865 | 950 | 587 | 568 | 859 | 786 |
| | Tg of cured product (°C.) | 101 | 108 | 131 | 96 | 117 | 120 |
| | Rubbery state elastic modulus (MPa) | 4.7 | 3.0 | 9.8 | 5.5 | 4.3 | 4.4 |
| CFRP properties | Tg (°C.) | 104 | 107 | 134 | 98 | 118 | 122 |
| | Tensile strength translation rate (%) | 81 | 84 | 75 | 80 | 83 | 83 |

TABLE 11

| Constituent element | | Component | Comparative Example 1 | Comparative Example 2 | Comparative Example 3 | Comparative Example 4 |
|---|---|---|---|---|---|---|
| [A] | [a1] | Tetraglycidyl diaminodiphenylmethane ("SUMI-EPOXY (registered trademark)" ELM434) | | 55 | 25 | 25 |
| | [a2] | Diglycidyl aniline (GAN) | 55 | | 30 | 30 |

TABLE 11-continued

| Constituent element | Component | Comparative Example 1 | Comparative Example 2 | Comparative Example 3 | Comparative Example 4 |
|---|---|---|---|---|---|
| Constituent element [A] other than [a1] and [a2] | Bis-A epoxy resin ("JER (registered trademark)" 828) | 45 | 45 | 45 | 45 |
| [B] [b1] | Diethyltoluenediamine ("Aradur (registered trademark)" 5200) | 19 | 20 | | 30 |
| [b2] | Isophoronediamine ("Baxxodur (registered trademark)" EC201) | 10 | 10 | 28 | |
| Curing conditions | Curing conditions | A | A | A | A |
| Resin properties | Viscosity (mPa · s) | 784 | 1785 | 1225 | 1252 |
| | Tg of cured product (° C.) | 115 | 146 | 133 | 131 |
| | Rubbery state elastic modulus (MPa) | 11.0 | 15.2 | 14.1 | 12.9 |
| CFRP properties | Tg (° C.) | 116 | 148 | 136 | 133 |
| | Tensile strength translation rate (4) | 72 | 68 | 68 | 71 |

TABLE 12

| Constituent element | Component | Comparative Example 5 | Comparative Example 6 | Comparative Example 7 | Comparative Example 8 | Comparative Example 9 | Comparative Example 10 |
|---|---|---|---|---|---|---|---|
| [A] | Tetraglycidyl diaminodiphenylmethane ("Araldite (registered trademark)" MY721) | | 60 | | 19 | | |
| | Triglycidyl-p-aminephenol ("jER (registered trademark)" 630) | | | 60 | 10 | | |
| | Bis-A epoxy resin ("jER (registered trademark)" 828) | | | | | 100 | 100 |
| | Liquid bisphenol A epoxy resin ("jER (registered trademark)" 825) | 100 | | 40 | | | |
| | Liquid bisphenol F epoxy resin ("jER (registered trademark)" 806) | | 40 | | 35 | | |
| | Glycidyl aniline (GAN) | | | | 15 | | |
| [B] | 3,3'-Dimethyl-4,4'-diaminodicyclohexylmethane ("Baxxodur (registered trademark)" EC331) | 18.1 | | 51.3 | | | |
| | Diethyltoluenediamine ("jER Cure (registered trademark)" W) | | | | 27.1 | | |
| | 4-Aminodiphenylmethane | 27.1 | 71.1 | | | | |
| | 3,3'-Diaminodiphenylsulfone (3,3'-DAS) | | | | 7.7 | | |
| | 4,4'-Diaminodiphenylaulfone ("SEIKACURE (registered trademark)" S) | | | | 3.9 | | |
| | 3-Dodecenyl succinic anhydride ("RIKACID (registered trademark)" DDSA) | | | | | | 134 |
| | Methyl tetrahydrophthalic anhydride (HN-2200) | | | | | 83 | |
| Accelerator | DBU-octylate ("U-CAT (registered trademark)" SA102) | | | | | 2 | 2 |
| Other ingredients | Core-shell rubber-containing tetraglycidyl diaminodiphenylmethane ("Kane Ace (registered trademark)" MX-416) | | | | 28.0 | | |
| | 4-t-Butylcatechol (DIC-TBC) | | | | 1.0 | | |
| Curing conditions | Curing conditions | A | A | A | A | A | A |
| Resin properties | Tg of cured product (° C.) | 92 | 90 | 157 | 165 | 134 | 73 |
| | Rubbery state elastic modulus (MPa) | 9.5 | 7.8 | 13.0 | 15.0 | 12.1 | 4.0 |
| CFRP properties | Tg (° C.) | 94 | 93 | 158 | 166 | 136 | 75 |
| | Tensile strength translation rate (%) | 76 | 78 | 71 | 67 | 71 | 82 |

TABLE 13

| Constituent element | Component | Comparative Example 11 | Comparative Example 12 | Comparative Example 13 | Comparative Example 14 | Comparative Example 15 |
|---|---|---|---|---|---|---|
| [A] | Diglycidyl aniline (GAN) | 25 | 50 | | | 25 |
| | Tetraglycidyl diaminodiphenylmethane ("SUMI-EPOXY (registered trademark)" ELM434) | | | | | |
| | Fluorene epoxy resin ("OGSOL (registered trademark)" PG-100) | 25 | 25 | | | |

TABLE 13-continued

| Constituent element | Component | | | | | |
|---|---|---|---|---|---|---|
| [C] | Bis-A epoxy resin ("jER (registered trademark)" 828) | 25 | 25 | 75 | 50 | 50 |
| | p-tert-Butyl phenyl glycidyl ether ("Denacol (registered trademark)" EX-146) | | | 25 | | |
| Epoxy resin other than [A] and [C] | Phenyl glycidyl ether ("Denacol (registered trademark)" EX-141) | 25 | | | 50 | 25 |
| [B] | Methyl tetrahydrophthalic anhydride (HN-2200) | 91 | 95 | 84 | 98 | |
| | Diethyltoluenediamine ("Aradur (registered trademark)" 5200) | | | | | |
| | Isophoronediamine ("Baxxodur (registered trademark)" EC201) | | | | | 14 |
| | 3,3'-Dimethyl-4,4'-diaminodicyclohexylmethane ("Baxxodur (registered trademark)" EC331) | | | | | 19 |
| Accelerator | DBU salt ("U-CAT (registered trademark)" SA102) | 2 | 2 | 2 | 2 | |
| Curing conditions | Curing conditions | A | A | A | A | B |
| Resin properties | Tg of cured product (° C.) | 116 | 136 | 125 | 66 | 86 |
| | Rubbery state elastic modulus (MPa) | 12.4 | 11.8 | 11.0 | 6.7 | 3.3 |
| CFRP properties | Tg (° C.) | 118 | 138 | 126 | 68 | 89 |
| | Tensile strength translation rate (%) | 69 | 69 | 70 | 79 | 82 |

| Constituent element | Component | Comparative Example 16 | Comparative Example 17 | Comparative Example 18 |
|---|---|---|---|---|
| [A] | Diglycidyl aniline (GAN) | | 50 | |
| | Tetraglycidyl diaminodiphenylmethane ("SUMI-EPOXY (registered trademark)" ELM434) | 30 | | |
| | Fluorene epoxy resin ("OGSOL (registered trademark)" PG-100) | | | |
| | Bis-A epoxy resin ("jER (registered trademark)" 828) | 20 | 60 | 80 |
| [C] | p-tert-Butyl phenyl glycidyl ether ("Denacol (registered trademark)" EX-146) | | 40 | |
| Epoxy resin other than (A) and [C] | Phenyl glycidyl ether ("Denacol (registered trademark)" EX-141) | | | 50 |
| [B] | Methyl tetrahydrophthalic anhydride (HN-2200) | | | |
| | Diethyltoluenediamine ("Aradur (registered trademark)" 5200) | | | 27 |
| | Isophoronediamine ("Baxxodur (registered trademark)" EC201) | | | |
| | 3,3'-Dimethyl-4,4'-diaminodicyclohexylmethane ("Baxxodur (registered trademark)" EC331) | 46 | 30 | |
| Accelerator | DBU salt ("U-CAT (registered trademark)" SA102) | | | |
| Curing conditions | Curing conditions | B | B | A |
| Resin properties | Tg of cured product (° C.) | 145 | 85 | 70 |
| | Rubbery state elastic modulus (MPa) | 13.2 | 5.2 | 6.4 |
| CFRP properties | Tg (° C.) | 148 | 87 | 72 |
| | Tensile strength translation rate (%) | 70 | 82 | 80 |

TABLE 14

| | | Comparative Example 19 | Comparative Example 20 | Comparative Example 21 | Comparative Example 22 | Comparative Example 23 | Comparative Example 24 |
|---|---|---|---|---|---|---|---|
| Resin properties | Tg of cured product (° C.) | 170 | 180 | 185 | 182 | 173 | 140 |
| | Rubbery state elastic modulus (MPa) | 16.9 | 14.2 | 16.0 | 19.2 | 18.0 | 13.8 |
| CFRP properties | Tg (° C.) | 172 | 183 | 189 | 185 | 175 | 142 |
| | Tensile strength translation rate (%) | 65 | 69 | 65 | 63 | 63 | 70 |

TABLE 15

| | Component | Comparative Example 25 | Comparative Example 26 | Comparative Example 27 | Comparative Example 28 | Comparative Example 29 | Comparative Example 30 |
|---|---|---|---|---|---|---|---|
| Resin properties | Tg of cured product (° C.) | 128 | 184 | 121 | 203 | 193 | 105 |
| | Rubbery state elastic modulus (MPa) | 13.2 | 18.8 | 13.0 | 25.0 | 21.1 | 11.2 |

TABLE 15-continued

| Component | | Comparative Example 25 | Comparative Example 26 | Comparative Example 27 | Comparative Example 28 | Comparative Example 29 | Comparative Example 30 |
|---|---|---|---|---|---|---|---|
| CFRP properties | Tg (° C.) | 129 | 187 | 122 | 205 | 195 | 108 |
| | Tensile strength translation rate (%) | 70 | 65 | 70 | 61 | 61 | 70 |

TABLE 16

| Component | | Comparative Example 31 | Comparative Example 32 | Comparative Example 33 |
|---|---|---|---|---|
| Resin properties | Tg of cured product (° C.) | 169 | 162 | 205 |
| | Rubbery state elastic modulus (MPa) | 15.0 | 13.2 | 19.3 |
| CFRP properties | Tg (° C.) | 171 | 163 | 204 |
| | Tensile strength translation rate (%) | 67 | 72 | 61 |

The epoxy resin composition of the present invention is suitably used for producing a fiber reinforced material that combines heat resistance with tensile strength translation rate at a high level. Further, the epoxy resin composition and the fiber reinforced material of the present invention are preferably used for sports applications, general industrial applications, and aerospace applications.

What is claimed:

1. An epoxy resin composition comprising the following constituent elements [A] and [B], comprising the following constituent elements [a1] and [a2] as the constituent element [A], and comprising the following constituent elements [b1] and [b2] as the constituent element [B], wherein the epoxy resin composition when cured into a cured product has a rubbery state elastic modulus in a dynamic viscoelasticity evaluation of 10 MPa or less, and the cured product has a glass transition temperature of 95° C., or higher:
   [A] a bifunctional or higher functional epoxy resin containing an aromatic ring;
   [B] an amine hardener;
   [a1] a trifunctional or higher functional aromatic epoxy resin;
   [a2] an optionally substituted diglycidyl aniline, wherein if the diglycidyl aniline is substituted the diglycidyl aniline bears at least one substituent selected from the group consisting of an alkyl group having 1 to 4 carbon atoms, a phenyl group, and a phenoxy group;
   [b1] a cycloalkyldiamine having a substituent on a carbon atom adjacent to a carbon atom bonded to each amino group; and
   [b2] at least one amine selected from the group consisting of 4,4'-methylenebiscyclohexylamine, 1,3-bisaminomethylcyclohexane, N-cyclohexyl-1,3-propanediamine, and isophoronediamine.

2. The epoxy resin composition according to claim 1, comprising 20 to 40 parts by mass of the constituent element [a1] and 20 to 60 parts by mass of the constituent element [a2] in 100 parts by mass of the total epoxy resin.

3. The epoxy resin composition according to claim 1, having a viscosity at 25° C. of 2,000 mPa·s or less.

4. A fiber reinforced material comprising a cured product of the epoxy resin composition according to claim 1 and a reinforcing fiber.

5. A molded article comprising the fiber reinforced material according to claim 4.

6. A pressure vessel comprising the fiber reinforced material according to claim 4.

7. An epoxy resin composition, comprising the following constituent elements [A], [B] and [C], comprising the following constituent elements [a2] and [a4] as the constituent element [A], and comprising the following constituent element [b1] as the constituent element [B], wherein the epoxy resin composition when cured into a cured product has a rubbery state elastic modulus in a dynamic viscoelasticity evaluation of 10 MPa or less, and the cured product has a glass transition temperature of 95° C., or higher:
   [A] a bifunctional or higher functional epoxy resin containing an aromatic ring;
   [B] an amine hardener;
   [C] a monofunctional epoxy resin which is a phenyl glycidyl ether substituted with a tert-butyl group, a sec-butyl group, an isopropyl group, or a phenyl group;
   [a2] an optionally substituted diglycidyl aniline, wherein if the diglycidyl aniline is substituted the diglycidyl aniline bears at least one substituent selected from the group consisting of an alkyl group having 1 to 4 carbon atoms, a phenyl group, and a phenoxy group;
   [a4] tetraglycidyl diaminodiphenylmethane; and
   [b1] a cycloalkyldiamine having a substituent on a carbon atom adjacent to a carbon atom having an amino group.

8. The epoxy resin composition according to claim 7, comprising 20 to 50 parts by mass of the constituent element [C] in 100 parts by mass of the total epoxy resin.

9. The epoxy resin composition according to claim 7, comprising constituent element [b1] and further comprising an aliphatic polyamine having an alkylene glycol structure as the constituent element [B].

10. The epoxy resin composition according to claim 7, comprising constituent element [b1] and further comprising isophoronediamine as the constituent element [B].

11. The epoxy resin composition according to claim 7, having a viscosity at 25° C. of 2,000 mPa·s or less.

12. A fiber reinforced material comprising a cured product of the epoxy resin composition according to claim 7 and a reinforcing fiber.

13. A molded article comprising the fiber reinforced material according to claim 12.

14. A pressure vessel comprising the fiber reinforced material according to claim 12.

* * * * *